US011196555B1

(12) United States Patent
Mouraveiko

(10) Patent No.: US 11,196,555 B1
(45) Date of Patent: Dec. 7, 2021

(54) SYSTEM AND METHOD FOR CAPTURING, RECORDING, MONITORING, EXAMINING, FILTERING, PROCESSING, LIMITING AND CONTROLLING INTRA-NETWORK AND EXTRA-NETWORK DATA COMMUNICATIONS

(71) Applicant: Timofei A Mouraveiko, Portland, OR (US)

(72) Inventor: Timofei A Mouraveiko, Portland, OR (US)

( * ) Notice: Subject to any disclaimer, the term of this patent is extended or adjusted under 35 U.S.C. 154(b) by 138 days.

(21) Appl. No.: 16/529,793

(22) Filed: Aug. 2, 2019

Related U.S. Application Data

(60) Provisional application No. 62/713,546, filed on Aug. 2, 2018.

(51) Int. Cl.
| | |
|---|---|
| *H04L 9/08* | (2006.01) |
| *H04L 29/06* | (2006.01) |
| *H04L 12/28* | (2006.01) |
| *H04W 4/14* | (2009.01) |
| *H04L 12/58* | (2006.01) |

(52) U.S. Cl.
CPC .............. *H04L 9/088* (2013.01); *H04L 69/22* (2013.01); *H04L 12/28* (2013.01); *H04L 51/22* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 8,793,358 B1* | 7/2014 | Godbole | H04L 45/40 709/223 |
| 10,489,387 B1* | 11/2019 | Rogynskyy | G06F 16/9535 |

(Continued)

*Primary Examiner* — Kaveh Abrishamkar

(57) ABSTRACT

A network appliance is provided. The network appliance includes a communications sub-system for sending and receiving data packets and network interface ports for individually connecting external computing devices so that the external computing devices' data communications must traverse the network appliance before reaching any other device or destination. The network appliance further includes electronic storage and memory comprising code executable by a processor to capture data packets, extract metadata from the data packets and store the data packets and their metadata with further capabilities to parse and examine the data packets and their metadata and apply instruction sets (aka rule sets) and command where the data packets and metadata should be stored, whether they should be modified and whether they should be allowed traversal through the network appliance according to their characteristics and content. The network appliance includes further logic for sorting, counting, correlating and analyzing data packets. The network appliance includes further logic to implement a method or process that allows human users of external computing devices to invoke a routine to temporarily or permanently enable or disable one or more instruction sets or rule sets without directly accessing or reconfiguring the network appliance through its management interface. Multiple systems and appliances could interconnect and securely communicate and share data via a tripartite or two-party encryption method.

8 Claims, 16 Drawing Sheets

*While Internet (1) is pictured here, network source (2) may be connected to other types of external networks in addition to or instead of the Internet (1).

(56) References Cited

U.S. PATENT DOCUMENTS

| | | | |
|---|---|---|---|
| 10,666,775 B1* | 5/2020 | Volpe | H04L 43/18 |
| 2012/0216080 A1* | 8/2012 | Bansal | G06F 11/3476 |
| | | | 714/45 |
| 2015/0010000 A1* | 1/2015 | Zhang | H04L 45/38 |
| | | | 370/392 |
| 2015/0281156 A1* | 10/2015 | Beausoleil | H04L 51/12 |
| | | | 709/206 |
| 2017/0063660 A1* | 3/2017 | Viquez | H04L 43/0894 |
| 2017/0249394 A1* | 8/2017 | Loeb | G06F 16/954 |
| 2018/0028735 A1* | 2/2018 | Demou | A61M 60/148 |
| 2020/0348662 A1* | 11/2020 | Cella | G05B 23/024 |

* cited by examiner

*While Internet (1) is pictured here, network source (2) may be connected to other types of external networks in addition to or instead of the Internet (1).

*While Internet (1) is pictured here, network source (2) may be connected to other types of external networks in addition to or instead of the Internet (1).

*While Internet (1) is pictured here, network source (2) may be connected to other types of external networks in addition to or instead of the Internet (1).

Fig. 4  *More detailed schematic of a LAN topology incorporating system (6)*

*While Internet (1) is pictured here, network source (2) may be connected to other types of external networks in addition to or instead of the Internet (1).

Fig. 5 — Variation of a LAN topology incorporating system (6)

Fig. 6  Comparison of Packet Processing* Coverage

* "Packet processing" means any type of examination, monitoring, firewalling, capturing, recording, filtering, blocking and similar processing of the packets. The dotted lines do not indicate equivalency, but merely presence.

Fig. 7
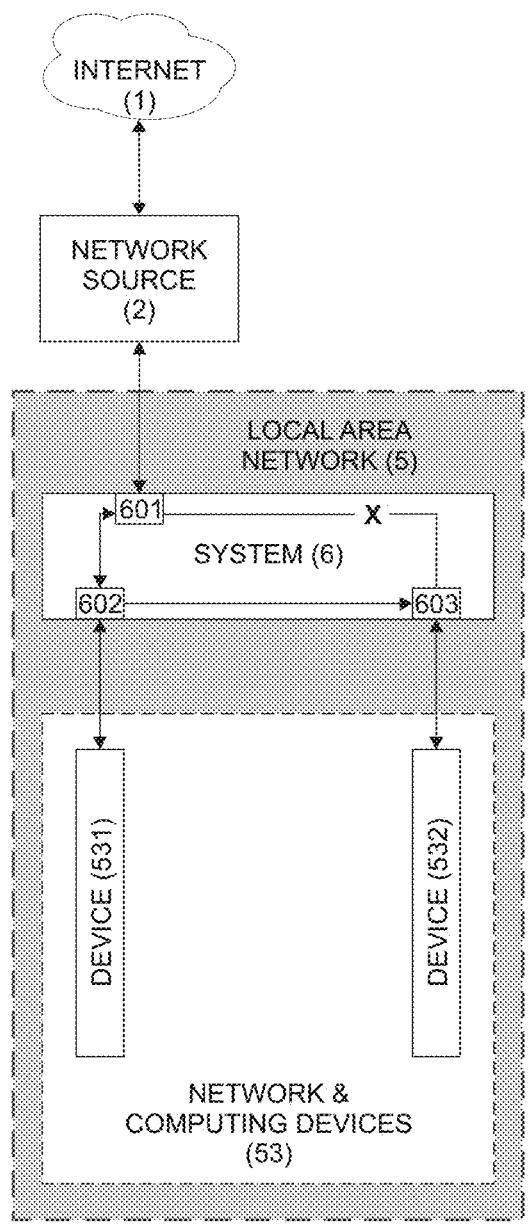
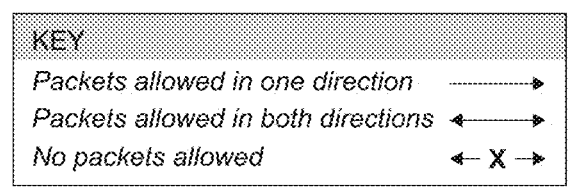

Fig. 10

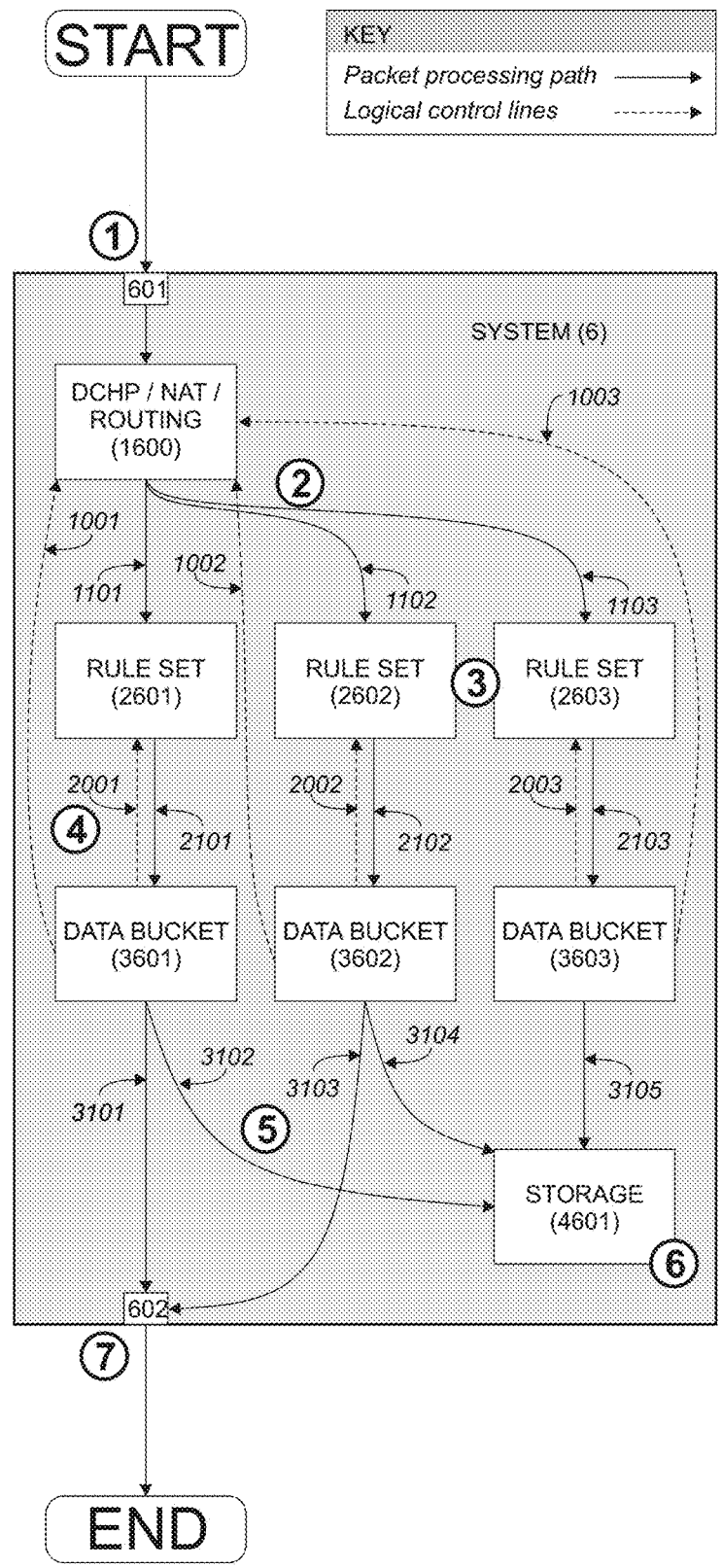

1. Packets arrive at port 601.

2. System (6) processes packets through logic for DHCP and NAT routing (1600), and then through rule sets 2601, 2602 and 2603.

3. Rule sets 2601, 2602 and 2603 sort the packets into data buckets 3601, 3602 and 3603.

4. The data buckets may send commands back to the rule sets via optional logical control lines 2001, 2002 and 2003, to dynamically modify the rules in the rule set(s). Likewise they may also send commands back to DHCP / NAT / Routing logic 1600 via optional logical control lines 1001, 1002 and 1003.

5. Data buckets 2601 and 2602 pass packets both to storage 3601 and port 602. Data bucket 2603 passes packets only to storage.

6. Storage (4601) collects and stores packets.

7. Packets leave system (6) from port 602.

SYSTEM AND METHOD FOR CAPTURING, RECORDING, MONITORING, EXAMINING, FILTERING, PROCESSING, LIMITING AND CONTROLLING INTRA-NETWORK AND EXTRA-NETWORK DATA COMMUNICATIONS

CROSS REFERENCE TO RELATED APPLICATION

This application claims priority to U.S. Provisional Patent Application No. 62/713,546, filed Aug. 2, 2018 entitled "System and Method for Capturing, Recording, Monitoring, Examining, Filtering, Processing, Limiting and Controlling Intra-Network and Extra-Network Data Communications," which is hereby incorporated by reference in its entirety for all purposes.

BACKGROUND

The typical computer network employs three types of networking equipment for switching, routing, processing, filtering and otherwise handling network traffic: switches, routers and firewalls. Some network administrators also deploy a fourth category of networking equipment, packet capture appliances, for capturing and recording network traffic. The "packet" in packet capture appliance refers to data packets, which are the building blocks of computer network communications, over both local area networks and wide area networks. A data packet is a unit of data that traverses a communication network and generally consists of a header and an optional payload; the header typically contains addressing information, checksums and other parameters. All four types of networking equipment process these data packets in some fashion, which may originate from outside the network (such as from the public Internet) or from networked devices and applications within the network. Networked devices may include computers, servers, printers, surveillance cameras, network attached storage, industrial control systems, data acquisition systems, smartphones and a wide variety of internet-enabled devices commonly referred to as IoT or "Internet of Things" products. These internet-enabled IoT devices range from thermostats, sensors and baby monitors to digital door locks, televisions, gaming consoles and even kitchen appliances.

Switches switch network traffic by moving packets from one port to another. Whether unmanaged or managed, switches provide the interconnecting fabric for networked devices. Routers route packets and may optionally assign IP addresses to network-connected devices. Firewalls serve the purpose of blocking packets or allowing packets to traverse the firewall; these communications generally originate from the Internet. Packet capture appliances capture and store copies of network packets, but do not alter the data stream or its contents.

FIG. 1 shows a typical configuration of networking equipment, in which the Internet source connects to a firewall, which in turn connects to a router. The router in turn connects to one or more switches, with individual networked devices (e.g., computers, servers, printers and etc.) connected to individual ports on the switch(es). This network topology also includes an optional packet capture appliance in between the firewall and the router. In this configuration, whether with or without the optional packet capture appliance, the individual devices within the network are treated as a whole from a security and monitoring standpoint, with the firewall blocking whatever it identifies as undesirable packets from entering the network interior from the Internet (or other external network). All communications originating from the devices inside the network are deemed "safe" by default and pass throughout the network as well as out to the Internet without hindrance or oversight.

In practice, however, not all packets originating within the network behind the firewall (and optional packet capture appliance), whether they remain within the network or pass out to the Internet or other external network, are, in fact, "safe." Both external and internal factors lead to network breaches and it is far from uncommon to have a computing or networking device within a network broadcast malicious packets and/or become hijacked by a hacker for purposes other than intended by the operator or owner of the network and its resident devices.

It is also often overlooked that the witting or unwitting actions taken by employees and other trusted network users on computing devices located within the network expose the network to spyware, adware, malware, viruses, trojans and other types of malicious, unwanted programs (hereafter referred to under the blanket term of "malware"), as do software flaws, zero-day exploits and misconfigured equipment and applications. Further, one infected or compromised device on a network rarely remains an isolated incident. In a typical network configuration any networked device, once compromised by malware, can deliver malicious packets to neighboring devices in order to infect them with malware, and thereby infect the entire network, even if the original breach or compromise affected only one single device. In other instances, malware may be introduced into a network by connecting a new supposedly trustworthy device that by secret design, through a design flaw or by means of a backdoor disseminates malware to other networked devices.

Since the typical firewall-router-switch network topology provides for neither the examination nor filtering of intra-network communications, the spread of malware across the network from infected or malicious devices essentially occurs in secret and without hindrance. In this fashion, many malware infections spread from an initial single compromised device to a large part, if not all, of the network without detection, which can lead to data loss, costly network disruptions, data corruption and the theft of sensitive, private and/or proprietary information. These data and network security problems affect a wide range of entities, spanning large corporations, government agencies, educational institutions, small businesses, retailers, professionals and, increasingly, private individuals in their own homes and offices.

Regardless of the sophistication of the firewall and/or other network security software and equipment, network intrusions occur every day from a number of causes, including chance, user error, equipment misconfigurations, brute force attacks, trickery and phishing (to name a few) and the typical network configuration offers no way to contain an intrusion or malware infestation once it reached the interior of the network. Only a device or application that monitors and controls both internal and external network communications can comprehensively address the multitude of vectors that can lead to security compromises and their spread across networks.

Switches and routers, while important for providing the switching and routing fabric of a network, are fairly simple devices (in purpose) that provide either switching or routing. They, however, contain no logic for examining, filtering, blocking or otherwise processing packets, aside from their switching and routing functions.

In the past, surveillance of in-network users has been attempted via software programs such as keyloggers and the like. In addition to addressing only one side of the problem, the usefulness of these programs is limited as they only record the keystrokes typed by the user to the exclusion of other potential activity. Since they reside on a computer that itself can become compromised through various means, they can become disabled and/or compromised themselves. They also contain no mechanisms to prevent one computing device from communicating with another within the network, or, for that matter, from communicating with a device outside of the network, nor do they provide the means for a network administrator or other party to monitor the communication packets that the computer or other computing device generates in real time or at all.

Another strategy has been to use firewalls to limit or filter communications seeking to enter the network from an outside connection (generally from the public Internet). Firewalls act according to a set of user-configured rules to prevent certain types of access from outside the network, but do not affect intra-network communications nor, generally, block packets from leaving the network. While useful in "patrolling" the perimeter of the network, their reach is limited to the network's external connections.

Packet capture appliances address some of the monitoring and data capture failings of the other networking devices mentioned herein, however, their sole purpose is to capture and record, not to apply rules to the packets nor to allow or disallow packets. Typically the purpose and role of a packet capture appliance is to passively capture and record all communications as a whole, without modifying or otherwise affecting the data stream. While the information they capture can prove useful, their reach is directly limited to the network link along which they are placed and they cannot provide visibility into the packets that travel elsewhere in the network.

If a digital intruder gains access, neither a traditional firewall, packet capture appliance, router or switch would have the capacity to contain the intrusion by isolating the affected device(s) from the remainder of the network.

Theoretically, one could employ a multitude of firewalls and/or packet capture appliances throughout the network, in addition to those located at the network perimeter, in order to block or allow or record packets traversing the network interior, however, this is not a practical solution in terms of cost, complexity and usability. The cost of peppering a network with one firewall and/or one packet capture appliance for each network-connected device would be prohibitive, even for the most cash-rich entities, while maintaining and configuring a sea of firewalls and packet capture appliances in any sort of comprehensive and workable fashion is near to impossible, with disastrous effects on network usability and the ability to troubleshoot equipment and related problems on the network. Such an installation may also require the deployment of additional routers and switches, more than would be needed otherwise, adding yet more to the cost and complexity. In practice, firewalls are not designed for this purpose, nor can they be successfully employed in such a fashion in real life applications, not the least because computing and network devices have the expectation that they would be able to intercommunicate with the neighboring devices on the local area network, such as a switch or a router, in a way that they would not be able to accomplish were a firewall to be their immediate neighbor.

In addition to the excess cost, complexity, space, cooling and power requirements of such an installation, further difficulty would come when attempting to harmonize, correlate, synchronize and investigate the data from the various firewalls and packet capture appliances placed around the network. Firewalls and packet capture appliances are not designed to communicate among themselves and there are currently no tools or products available that would allow you to merge the data from a multitude of firewalls or packet capture appliances into a coherent, comprehensive picture with the ability to visualize and monitor the network data while at the same time maintaining (or, rather, not interfering with) the routing and switching process efficiencies afforded by routers and switches.

Another detraction of the typical firewall is that it can only operate with a one-dimensional rule set. By comparison, the current invention instead allows the configuration and implementation of multi-dimensional rule sets and data scenarios, incorporating rules, keywords/signatures and virtual data processing and storage resource units. The current invention also incorporates additional functionalities that firewalls do not offer, such as network activity monitoring, packet capture, data collation, triggered actions and the ability to create temporary access to devices, either externally or internally (a process further explained below).

An alternate theoretical possibility would be to use VLAN functionality to create virtually isolated networks that are physically connected using the same network switch or group of network switches. VLAN tags are a crude way to limit communications between groups of machines within the same LAN or between groups of machines and the Internet (or other external or internal destinations). One problem with this approach is that not all computing and networking devices are capable of supporting VLAN tags, in which case their communications would fail completely. Some managed switches support VLAN functionality, but not all. In a way a VLAN is merely a way to virtually enlarge a managed switch by connecting a second managed switch to it and thereby increase the number of physical ports available. VLAN capabilities, however, are limited and do not even approach what a firewall can do in filtering packets.

Further, VLAN tags are typically assigned per device, with all packets associated with one computing or network device sharing the same VLAN tag. While it may be possible in some circumstances to assign a different VLAN tag to a specific application running on a device, this cannot be achieved centrally, but would require that the application be re-designed or re-configured in order to associate a unique VLAN tag to just the application (but not the device on which it is running). By comparison, to achieve per-application packet processing with the current invention no network changes or application modification or reconfiguration are required to achieve the separate processing of different applications' and different devices' network communications.

SUMMARY

This disclosure is directed to a network appliance and related systems/methods which may be used in a manner to increase the security and usability of computing devices in a communication network, such as a local area network (LAN) or wide area network (WAN), and make them less vulnerably to unauthorized access by addressing the problems presented by the unrestricted communications that take place throughout the interior of a computer/data network (i.e., behind the traditional firewall located at the perimeter and enabled by the switching and routing fabrics provided by the routers and switches located within the interior of computer networks), while sidestepping the various issues presented by the theoretical solutions of deploying a multitude of firewalls or attempting to adapt VLAN capabilities. Additionally, this appliance/system includes processes for human users of external computing devices to invoke a rule change or change of rule set or enable and disable instruction sets and rule sets without directly accessing and configuring the system/appliance.

The subject invention is a system and method for capturing, recording, monitoring, examining, filtering, processing, limiting and controlling intra-network and extra-network data communications. This invention allows for the individual monitoring, isolation and segregation of individual network devices and applications by combining and harmonizing the functions of a switch, a router, a firewall and a packet capture device with additional capabilities to monitor and graphically visualize network packet flows in real time and historical time and trigger actions, such as alerts, and to dynamically switch or modify packet processing rules and parameters upon receipt of a formatted communication from a human user. Packet processing, including capture, monitoring, control and blocking/allowing (firewalling), may be applied on a per-device or per-application basis, effectively giving network administrators, owners and operators the ability to allow, deny, filter, restrict and otherwise control communications to, from and between individual networked devices and/or individual applications, in addition to capturing and monitoring their individual network traffic. Likewise, the current invention may provide the same types of packet processing on a per-device or per-application basis between individual devices and applications on the network and sources and destinations outside the network perimeter (generally the public Internet, however, it would be possible to set up a subnetwork with its own perimeter within a larger network or connect to an external network other than the public Internet). In this fashion, the communications to and from each device and application on the network may be supervised, monitored, recorded, controlled and reported separately and individually, with no security blindspots in which malicious programs and actors could hide.

The current invention may take the place of all four typical networking components in the typical network (i.e., traditional firewall, router, switch and packet capture appliance), however, it may also be deployed in conjunction with other networking appliances and routing and switching fabrics as well.

In one example, a system and method for capturing, recording, monitoring, examining, filtering, processing, limiting and controlling intra-network and extra-network data communications (the current invention) is provided, with logic capable of capturing, recording, monitoring, filtering, sorting, blocking and otherwise processing data packets. The system (the current invention) includes a device having memory executable via a processor, which can be physically or wirelessly communicatively connected to computers, servers, printers, VoIP telephones, applications and IoT devices (basically any device capable of connecting to and communicating with other devices and applications via the Internet or a computer network) via a number of different types of network interfaces and other communication interfaces. Possible network interfaces may include those capable of connecting to other networked devices using copper or fiber cables, such as RJ-45 ports, multi-mode fiber ports and single-mode fiber ports, however, the current invention may utilize any combination of communication methods and associated hardware ports and cables over which computers, servers and other network-connected devices may send and receive communications. Additionally, the current invention may include a radio-capable antenna for receiving and sending packets to and from wirelessly-connected computing devices and other wireless network-connected devices or applications.

The current invention may physically include enough network interface ports to directly and individually connect all devices on a computer network to the current invention. Should the number of devices on the network exceed the number of available physical network interface ports on the current invention, it would also be possible to virtually connect devices to the current invention by means of an external multiplexer or similar device (such as a managed switch), which would allow multiple networked devices to be connected via the multiplexer to one or more physical ports on the current invention. In such a configuration the networked devices or applications could be identified by MAC address or IP address. All traffic from the networked devices and applications connected by means of a multiplexer could first go through the current invention for packet processing as determined by the current invention's rules before being routed to its final destination. In such a configuration with a multiplexer or switch, some functionalities may be limited in relation to the devices connected via the multiplexer or switch. To mitigate this, the current invention could be natively expanded by increasing its number of physical ports or by interconnecting two or more systems based on the current invention.

The current invention includes capabilities for packet processing that combine the functions of routers, firewalls, packet capture appliances and switches with monitoring, automated alerts and triggered actions plus graphical visualization via a system of rules and virtual data processing and storage resource units ("VDPSRUs," described later). This packet processing logic may be applied to network communications in aggregate and individually, on a per-device and/or per-application basis, which allows the network administrator (or other user) to restrict and monitor not just external communications, but also inter-talk between individual internally-connected network devices and applications. In this fashion, individual devices and applications within the same local area network could be isolated and segregated from one another and individually monitored, either in full or on a per-application or other data scenario basis, as afforded by the current invention's system of rules and VDPSRUs. Since it can be applied on a per-device and/or per-application basis, inter-talk could be monitored and restricted for some devices or applications, partially monitored and restricted for others and/or monitored and unrestricted for the rest, depending on the operator's preferences.

Per-device/per-application packet processing (including capturing, recording, monitoring, firewalling, filtering and etc.) is conducted through a concept of virtual data processing and storage resource units ("VDPSRUs") combined with instruction sets (aka rule sets). These VDPRSUs are the conceptual nuclei of the current invention's packet processing system, through which descriptors are defined to identify individual networked devices and/or applications and identify, collect, sort, monitor and control the individual device's and/or application's flow of network traffic. These descriptors may include rules based on networking parameters (e.g., packet protocol, source and destination IP addresses, source and destination MAC addresses, VLAN, VLAN2, frame size, source and destination ports, and etc) and rules based on the content of the packet's payload, which may also be referred to as keywords and signatures.

One of the strengths of the current invention's VDPSRU structure is that one packet may match more than one VDPSRU, allowing operators and users to construct multiple, multi-dimensional data scenarios in order to be able to examine the same network data from multiple perspectives. For example, they may construct one VDPSRU and its set of rules to collect a general aggregation of network traffic and create other VDPSRUs with associated rules that collect a subset of data packets at a more granular level. Unlike some other network systems that utilize rules, such as firewalls, with the current invention administrators and users need not fear that a match to one VDPSRU would preclude it from matching another.

In addition to identifying the data streams of individual networked devices and applications, the VDPSRUs may be configured with commands to allow or block the traversal of individual packets to, from and between individual networked devices and applications based on the characteristics of individual packets in the datastream and/or based on a daily, weekly, monthly, yearly or other time-based schedule. Further rules may be implemented to direct individual packets to a different destination than indicated by the packet header and/or record the packets to internal or external storage based on the characteristics of individual packets in the datastream and/or based on a daily, weekly, monthly, yearly or other time-based schedule. Additionally, alternate sets of rules may be in operation based on daily weekly, monthly, yearly or other time-based schedules, for example, in an office setting one set of less-restrictive rules may be in operation during "regular" hours while another more-restrictive set may be in force during "after" hours.

Rules may also be configured to detect a sequence of events in the stream of network packets, as opposed to tracking single instances. For example, a rule could be configured to watch for event A followed by event B within ten seconds, and, optionally, if this sequence of events occurs in the described time frame, generate an alert, log entry or take some other form of action. It will be appreciated that while this example uses only a sequence of two events, any number of events could be included in the sequence described by the rule over any desired length of time. The events described by the rule may be based on networking parameters (e.g., packet protocol, source and destination IP addresses, source and destination MAC addresses, VLAN, VLAN2, packet size and source and destination ports) and/or based on the contents of packet payloads, which may also be referred to as character strings, keywords and signatures.

In addition, the current invention may include logic to use a virtual switch to cause, enable or disable specific operations or actions. This may include operations and actions that affect packet processing behavior or not, such as making a notation in a log or executing a chain of actions for intelligence gathering purposes. For example (and as illustrated in FIG. 11), a computer network may include Computer C used by User U. The system operator could devise a rule (or rules) that if on a weekday between the hours of 9 AM and 5 PM the current invention detects that traffic above a certain threshold takes place between Computer C and Server S and sustains it above that level for a pre-set length of time, then it determines that the computer is in use and makes an entry to the effect that User U is most likely present. Likewise, if the communication level between Computer C and Server S drops after it had been noted that User U was present, this drop may trigger a notation that User U is no longer present.

It will be appreciated that this mechanism for gathering intelligence may incorporate detection of a large number of different conditions, not just whether usage of a certain computer at a certain level indicates that a user is present. For example, further rule(s) may be configured to include detection for unusual levels of communication activity between Computer C and Server S (or to and from Computer C in general) on the weekends and outside of the hours of 9 AM to 5 PM. At those times, if such communications rise above a level pre-set by the operator, it may deduce that unusual activity is taking place and trigger a notation or email alert to that effect. In this fashion, by combining rules and chaining them to actions, the current invention may generate new knowledge and network intelligence.

The packets that traverse the current invention may be also indexed and tallied, for example, for use in creating reports, either on an aggregate or a per-device and/or per-application basis.

The current invention includes a mechanism (programmed logic) to discover what devices and applications are present and operational on the network to which it is connected, with the ability to automatically create a new virtual data processing and storage resource unit ("VDPSRU," this element is further defined below) and apply a default set of rules for monitoring, capturing, recording, routing, firewalling and otherwise processing the packets sent to and from each new device or application as it is discovered. The user/operator would have the ability to modify these rules as needed and desired.

The current invention also includes a process for temporarily adding or removing restrictions on specific communications to and from individual networked devices and applications. This may be accomplished, for example, through the entry of a user name and password, or by means of operating a secure application launched on a smartphone or computer located outside of the network on which the current invention is deployed. This may specifically allow communications between an individual device or application within the network and the device on which the application is launched without opening up the networked device to communications with other devices or applications on the local area network or the Internet. The access may be granted for either a discrete period of time or until an event takes place triggering the restoration of the original access restrictions or implementation of alternate access restrictions. Such a triggering event may include a message sent from a secure application located on a smartphone, computer or other device located outside the local network on which the current invention is deployed or the passing of a pre-set period of time during which no communication activity takes place between the device located outside of the local area network on which the current invention is deployed.

To give an example, a user may wish to install an inexpensive IP surveillance camera on the local area network in order to take advantage of its video recording functions and low cost, but have concerns about the device's trustworthiness (the fear being that a cheap IP camera may also include spyware and/or other forms of malware and thereby expose other equipment, computers and IoT devices on the local area network to spying, data corruption, data theft and other security compromises). With the deployment of the current invention, either with or without the optional management access process, the network operator/user may effectively isolate the IP camera from both the rest of the devices and applications located on the local area network and from the public Internet, both preventing the potential spread of malware from the IP camera to other networked devices and applications and making it impossible for the IP camera to connect to servers or other equipment located outside of the local area network. With the management access process, the user can maintain the isolation of the IP camera from other equipment on the local area network and from the Internet, while temporarily allowing extremely limited remote point to point communications between the IP camera and his or her smartphone or PC, for example, in order to check video footage.

In addition to its packet processing capabilities, the current invention may include logic for DHCP and NAT routing, as well as other common routing protocols such as RIP, BGP, OSPF, EIGRP, IS-IS and others, and switching, making it possible for it to act as the switching and/or routing fabric between networked devices and applications or between networked devices and applications and the network source/Internet.

The current invention's greatest strengths may come into play when connected to multiple devices, however, it also offers benefits when connected to only one device, in its capabilities for monitoring, recording, filtering and visualizing traffic and its system of VDPRSUs and rules for granting or denying accessing and triggering alerts or other actions. Most if not all computers, smartphones, tablets and similar devices are capable of running multiple, simultaneous applications and frequently do. The current invention would make it possible to monitor these applications individually. Even if the user's intention is to run only one application on one device, it is useful to know whether any additional unknown (and potentially harmful) applications are attempting to communicate with other devices, either locally or remotely.

With multiple devices you get all those same benefits, plus the ability to individually isolate devices and applications (partially or fully) and monitor and control intra-network communications, as described more fully above and below.

BRIEF DESCRIPTION OF THE FIGURES

FIG. 7 illustrates how the current invention (identified as system (6)) could isolate a network-connected device or application and not allow it to communicate with neighboring devices or applications on the same local area network nor the Internet.

FIG. 9 further illustrates an example of how the current invention could orchestrate the directional filtering of a device/application's network traffic.

FIG. 10 is a visual depiction of the process logic within the current invention (identified as system (6)) whereby incoming packets are processed, routed and optionally blocked, allowed, sorted, copied and stored before passing out to their destination.

DETAILED DESCRIPTION

Many of the figures (FIGS. 4-10, specifically) attached to this patent application show per-device packet processing, however, the detailed descriptions in this text refer to both per-device and per-application packet processing. To prevent over-burdening the graphics, depictions of the individual applications running on individual devices have been omitted, but it should be understood that the current invention is capable of both per-device and per-application packet processing. In a real-world environment a single computing or network device may generate and receive communications for multiple applications or only for one application, depending on its type, purpose and configuration. With the current invention, users may choose whether to process packets for one device as a whole, regardless of how many separate applications the device is running, or they may break the packet processing down further to the level of the individual applications. As explained more fully in paragraph 122 below and shown in FIG. 13, in addition to processing packets for individual computing and network devices, the current invention may also separately process the packets related to the individual applications running on the individual devices or an application commonly run among several individual devices. As such, any reference to or explanation of the current invention's per-device packet processing should be understood to also encompass per-application packet processing and vice versa.

Figure 1:
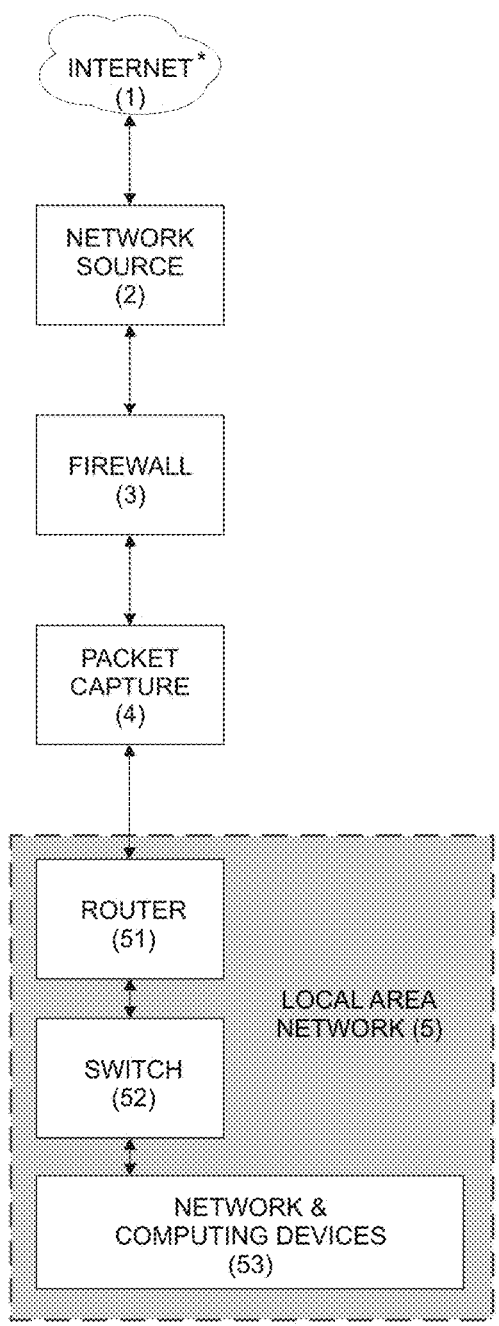
FIG. 1 shows a schematic depiction of a currently typical network topology with a firewall at the perimeter (and an optional packet capture appliance) connected to one or more routers, which in turn connects to one or more switches through which individual devices are connected.

For comparison purposes FIG. 1 illustrates a typical LAN topology used for computer networks connected to the Internet (1) via network source (2). Network source (2) may be a wireless or wired modem, cable modem, a dial up modem, a Digital Subscriber Line (DSL) modem, an optical network unit or any device that translates the ISP's signal to the signal type used by the local area network. From the network source, internet/network transmissions run through a firewall (3) and an optional packet capture appliance (4) and then reach the local area network (5). The local area network includes router (51), switch (52) and various network & computing devices (53). It will be appreciated that network & computing devices (53) may include any number of different network and computing devices, including but not limited to PCs, laptop computers, VoIP telephone sets, routers, switches, IoT devices, VoIP cameras, smartphones, network-attached storage, and email, file, web, video game, database and other types of servers. Network and computing devices (53) may further include various web-based, network-based or other applications. Additionally, multiple routers and switches may be deployed.

In this typical LAN topology, the local area network (5) and its network and computing devices (53) are treated as a whole, for the purposes of the firewall (3) and packet capture appliance (4). As such, any internal communications within local area network (5), such as those that may take place between individual network and computing devices (53) via switch (52) or router (51) would not fall under the purview of firewall (3) or packet capture appliance (4).

Figure 2:
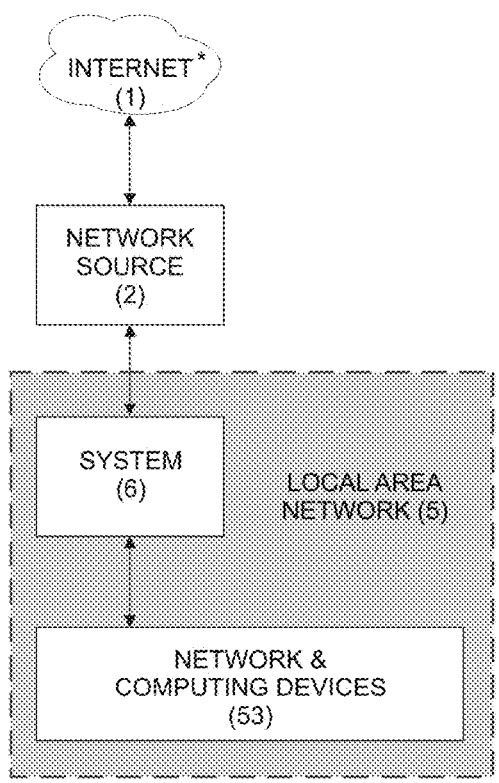
FIG. 2 shows a schematic depiction of a network topology with the current invention (identified as system (6)) taking the place of the firewall, packet capture appliance, router(s) and switch(es).

FIG. 2 illustrates a typical LAN topology similar to FIG. 1 wherein the firewall, packet capture appliance, router(s) and switch(es) have been removed and instead the current invention (referred to as system (6) here and in other drawings) deployed. As illustrated in more detail in FIG. 4, system (6) connects to and treats the network and computing devices (53) and the network source (2) individually for its packet processing purposes. In the case of system (6), packet processing may include packet monitoring, packet recording, packet filtering, packet blocking, and packet re-routing, among other possibilities. In this fashion, all network communications, whether directed internally among the network and computing devices (53) or directed externally to the Internet (1) via the network source (2) are subject to the system (6)'s packet processing (as compared to FIG. 1, where only the packets going to or arriving from the Internet (1) via network source (2) are subject to the functions of firewall (3) or packet capture appliance (4) and firewall (3) and packet capture appliance (4) are essentially blind to and have no effect on the communications that take place within the local area network (5)).

Figure 3:
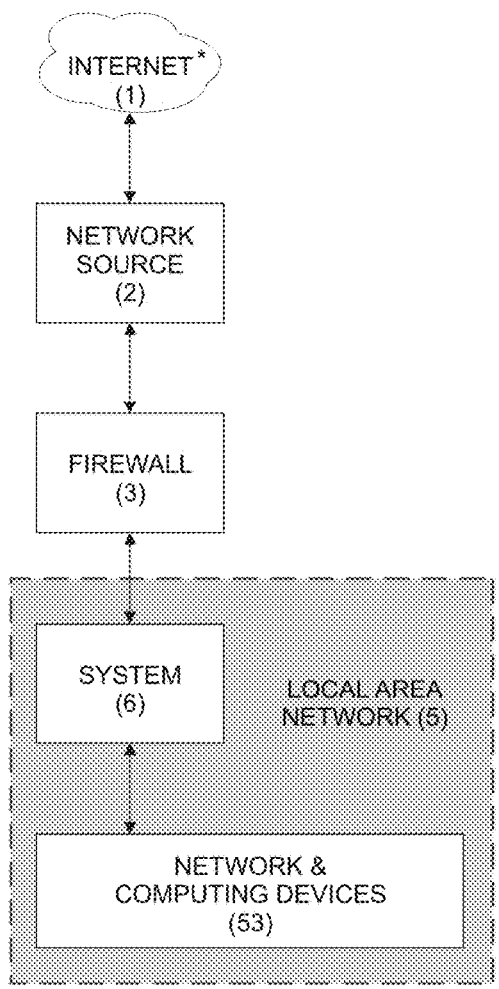
FIG. 3 shows a schematic depiction of an alternate network topology using the current invention (identified as system (6)) in place of the packet capture appliance, router and switch(es), but retaining the traditional firewall at the perimeter.
Figure 4:
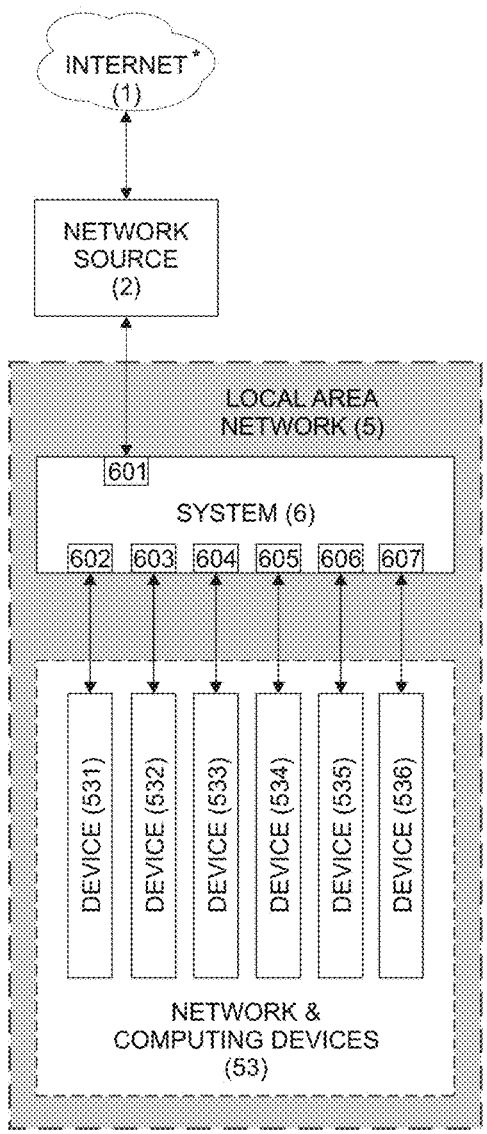
FIG. 4 is a detailed schematic depiction of the network topology shown in FIGS. 2 and 3. In this depiction, all local network and computing devices are directly connected to the current invention (identified as system (6)).

FIG. 3 shows a variation of the embodiment illustrated in FIG. 4, in which a traditional firewall (3) has been deployed between system (6) and network source (2). The effect of this change as compared to the topology illustrated in FIG. 2 is that two devices capable of providing firewall functions are present between network source (2) and local area network (5), which some users may find desirable for adding a second layer of security or providing additional or other functionality or other reasons. As a result of the presence of firewall (2) between network source (2) and system (6), system (6) may not receive and process the full stream of data received from the Internet (1) by network source (2), as firewall (2) may block some of the packets received from the Internet (1) and not allow them to penetrate further into the LAN.

FIG. 4 shows an embodiment of the current invention, which may include a system (6) communicatively coupled between the individual devices and applications of local area network (53)—which includes devices 531, 532, 533, 534, 535 and 536—and network source (2). Network source (2) and devices 531, 532, 533, 534, 535 and 536 may be physically connected to ports 601, 602, 603, 604, 605, 606 and 207 on system (6) via network cables (such as cat-series Ethernet or fiberoptic) or may connect wirelessly via wireless network protocols or other suitable methods. In some examples system (6) may utilize connecting cables for set up, such as a cable connecting system (6) to network source (2), cables connecting system (6) to local area network (5)'s network and computing devices (53) and a power cable. In some examples, system (6) may be coupled to an external power source (e.g., wall outlet, power strip, etc.) or alternatively the recording device may include it own internally located power source (e.g., battery module). In some embodiments system (6) may also include multiple receptacles (aka power "inlets") allowing it to be connected to multiple external power sources, such as sealed lead acid (SLA) batteries, DC power supplies and AC power supplies, as well as the primary AC source. In some embodiments system (6) may also include internal power sources, such as rechargeable batteries.

Network source (2) may be connected to an external network, such as the Internet (1). It will be appreciated that while Internet (1) is pictured in FIG. 4 and the other figures, network source (2) may be connected to other types of external networks in addition to or instead of the Internet (1). Alternatively, local area network (5) could be a subset of a larger local network to which it is connected via system (6) (in which case there would be no need for network source (2) to translate the signal). The local area network (5) may be configured to send and receive data from the Internet (1) and local area network devices 531, 532, 533, 534, 535 and 536 may be configured to send and receive data among themselves as well. Local area network (5) may include a plurality of local network and computing devices and applications such as devices 531, 532, 533, 534, 535 and 536 as well as other devices such as switches, Voice over Internet Protocol (VoIP) devices, Internet of Things (lot) devices, personal computers, laptops, network attached storage, Internet Protocol (IP) cameras, data servers, etc. It will be appreciated that local area network (5) may include a plurality of computing devices and applications in other embodiments. System (6) may act as an intermediary between the Internet (1) and all network and computing devices and applications located on the local area network (53) as well as an intermediary between individual devices 531, 532, 533, 534, 535 and 536.

System (6) may be configured to perform various functions when data passes through the device, including to route and switch network packets sent both to and from local area network (5) and network source (2) and between devices and applications within local area network (5). System (6) may also be configured to record network packets sent both to and from local area network (5) and network source (2) and between devices and applications within local area network (5). Further, system (6) may encrypt the recorded packets using a key. System (6) may also be configured to examine the characteristics and contents of the network packets sent both to and from local area network (5) and network source (2) and between devices and applications within local area network (5). System (6) may also be configured to block or allow network packets sent both to and from local area network (5) and network source (2) and between devices and applications within local area network (5) according to the network packets' characteristics and/or contents. System (6) may also be configured to re-direct or re-route network packets sent both to and from local area network (5) and network source (2) and between devices and applications within local area network (5) according to the network packets' characteristics and/or contents.

Figure 5:
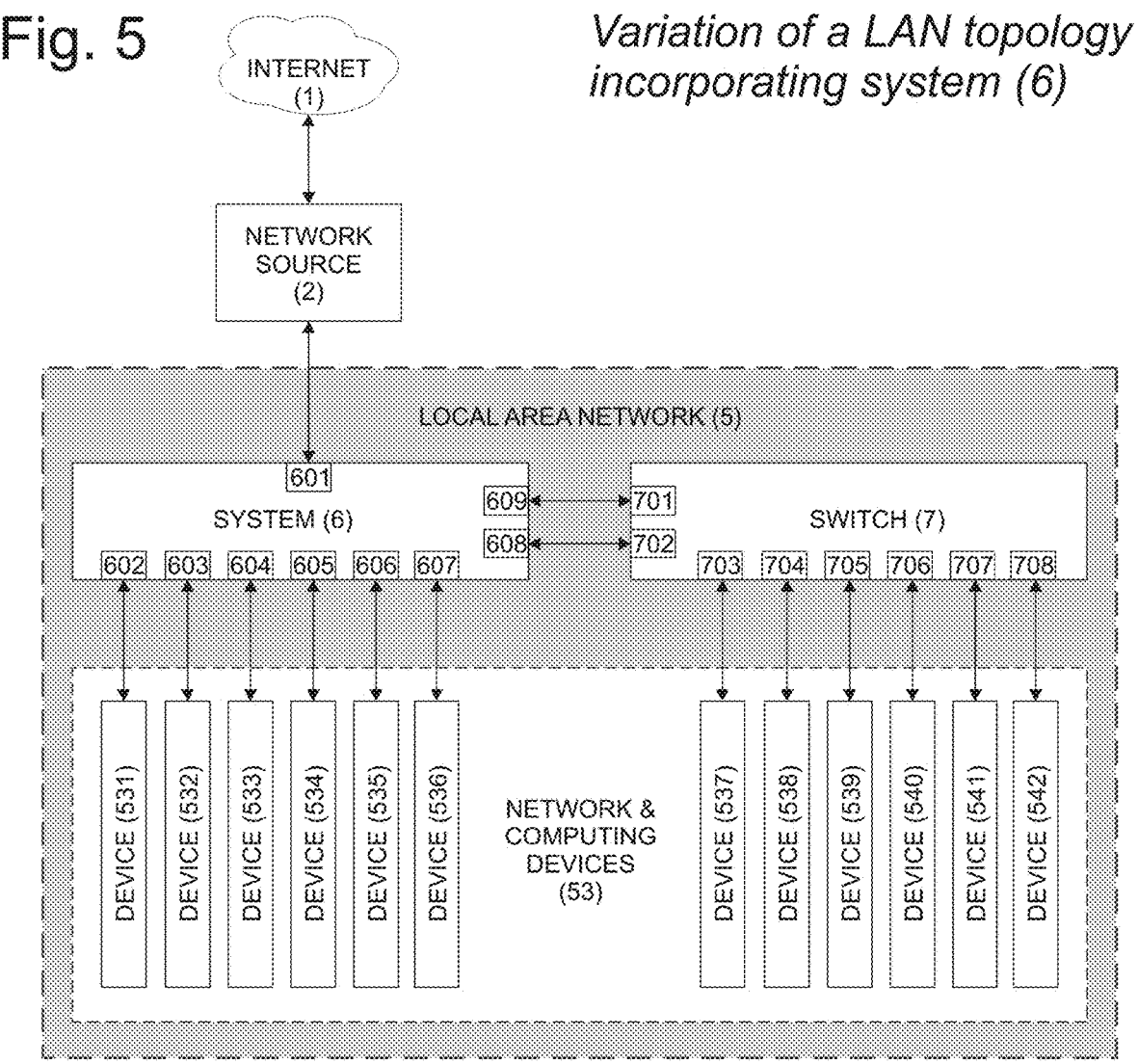
FIG. 5 shows how the current invention (identified as system (6)) may be used in conjunction with a switch to increase the number of devices that may be connected and networked through the current invention, both by directly connecting to the current invention's own physical ports and, by extension, through the switch's physical ports.

FIG. 5 shows a variation of the embodiment illustrated in FIG. 4, in which a separate network switch (7) has been connected to system (6). In this example, system (6) and switch (7) are connected via two links, between ports 609 and 701 and ports 608 and 702. While an example of two links is used in this figure, it will be appreciated that the number of links between the two devices may be greater or lesser than two. The connection of switch (7) to system (6) is one possible method for increasing the number of individual network and computing devices that may be connected to system (6), beyond the physical number of ports present on system (6). As shown in this example, the addition of switch (7) allows the addition of connections to devices 537, 538, 539, 540, 541 and 542, however, any number of additional local network and computing devices may be connected to system (6) via one or more network switches. It would also be possible to similarly interconnect two or more instances of the current invention instead of a switch(es) in order to increase the number of physical ports available to which devices may be connected.

Figure 6:
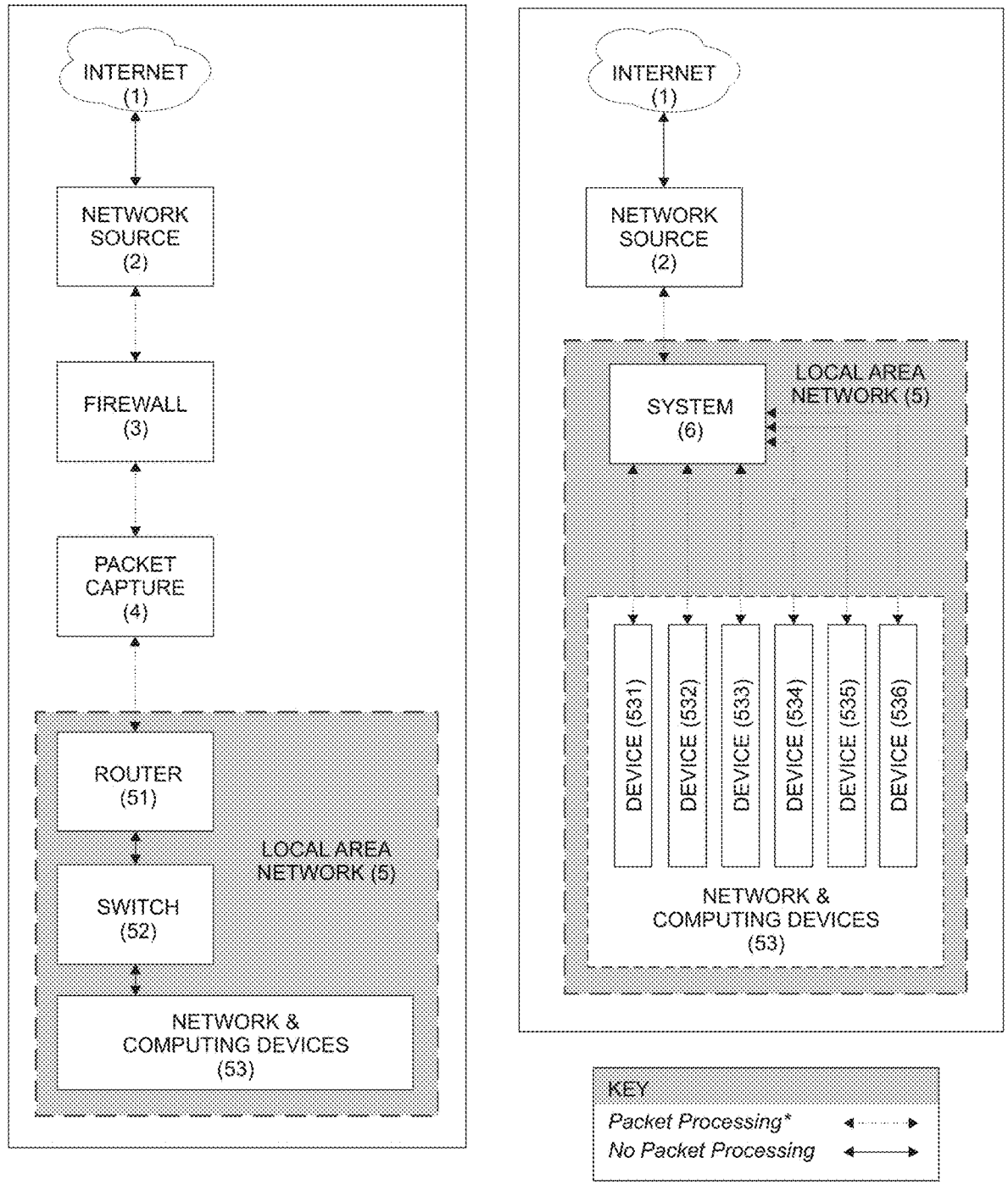
FIG. 6 shows a comparison of the packet processing coverage (e.g., for the monitoring, examination, blocking and etc. of data packets on the network) in the different topologies illustrated by FIGS. 1 and 4.

FIG. 6 is an illustrative comparison between the packet processing coverage afforded by the topology shown in FIG. 1 and the topology shown in FIG. 4. Here and throughout this document and its diagrams we use the term "packet processing" broadly to describe any type of packet-based firewalling, monitoring, capturing and recording, blocking, allowing, filtering or examination of the network traffic. In these two comparative drawings, the solid lines indicate that no packet processing is present, while the dotted lines indicate the presence of some type of packet processing. The comparison here is not meant to indicate any equivalency between the packet processing that takes place in one example versus the packet processing that takes place in other; rather, the dotted lines merely indicate the application or presence of any type of packet processing along a link in either topology. As is shown in the drawing adapted from FIG. 1, the network topology incorporating firewall (3) and packet capture appliance (4) between network source (2) and local area network (5) only has packet processing present on the network path between network source (2) and router (51), with no packet processing available between individual network and computing devices (53), between network and computing devices (53) and switch (52) nor between router (51) and switch (52). As shown in the drawing adapted from FIG. 4, packet processing is present throughout local area network (5), from network source (2) all the way to and between individual network and computing devices 531, 532, 533, 534, 535 and 536, without any gaps in packet processing coverage.

FIG. 7 shows an example of how individual devices and applications, while present on a local area network, may be communicatively isolated from external networks and from other devices and applications on the local area network. In this example system (6) connects to network source (2) on port 601. Devices 531 and 532 connect separately to system (6) via ports 602 and 603, respectively. While device 531 is allowed to freely send and receive traffic to and from the Internet (1) (or another type of external network), device 532 is neither allowed to send nor receive packets from the Internet (1), as shown by the broken line with an "X" between ports 601 and 602. Device 531 is also allowed to send packets to device 532, as illustrated by the unidirectional arrow originating from port 602 and pointing to port 603, however, device 532 is not allowed to send packets to device 531. It will be appreciated that while this example includes only two network and computing devices, more or less than two devices or applications may be linked to system (6) in other embodiments. It will be appreciated that in an alternate example local area network (5) could be a subset of a larger local network to which it is connected via system (6) (in which case there would be no need for network source (2) to translate the signal).

Figure 8:
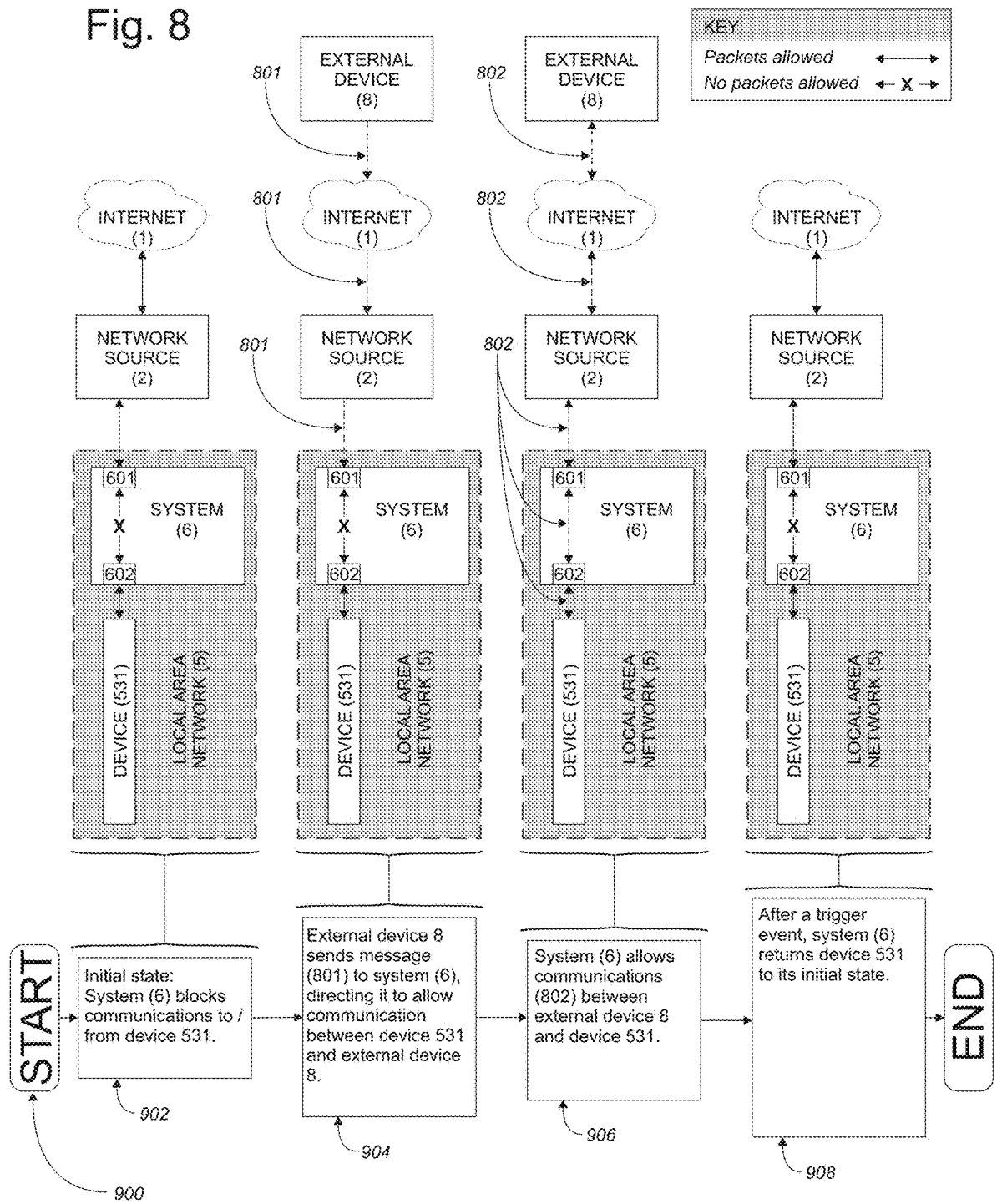
FIG. 8 shows a process flow for remotely enabling external access or otherwise changing the communication restrictions for a specific networked device or application located behind the current invention from a device located outside of the local area network.

FIG. 8 shows an example process flow 900 for enabling temporary, limited access to a device or application that has been isolated from the Internet. Both the steps in the process flow as well as the corresponding configuration for accessibility of the isolated devices are depicted. It will be appreciated that the LAN devices depicted in FIG. 8 could equally be applications and that the external device shown could equally be a device present on the same local network. As shown, process flow 900 is implemented via the systems, components, devices, and etc. described with regards to FIGS. 2-7, however, in other embodiments other suitable systems, components, devices, applications and etc may be used to implement method 900. For example, in other examples Internet (1) may be another type of external network, or Internet (1) may be a larger local area network of which the depicted local area network (5) is but a portion, in which network source (2) may instead take the form of a router or other networking device or may not be present. Equally, all devices and connections depicted could be local. In other examples, more devices (and applications) in addition to device 531 may be linked to system (6) and made individually inaccessible or accessible (either partially or fully) via a method similar to process flow 900. It will be appreciated that process flow 900 could also be initiated by a device located within local area network (5).

At step 902 and throughout the steps of process flow 900, Internet (1) connects to system (6)'s port 601 via network source (2). Device 531 is concurrently connected to system (6)'s port 602. In its initial state, system (6) does not allow communications received on port 602 to pass through to port 601 and vice versa, with the result that device 531 may not receive nor send packets to and from the Internet (6). It will be appreciated that in other examples additional devices and/or applications may be connected to system (6), whose initial states may be similar to device 531's or may not be similar.

At step 904 the process flow includes initiating communication 801 from external device (8) via the Internet (1) to system (6), requesting that system (6) allow packets to pass between external device (8) and device 531. External device (8) may be a smartphone, laptop, personal computer or other type of computing device external to local area network (5) yet connected to Internet (1). It will be appreciated that in other examples system (6) could be directed to allow unrestricted communications between device 531 and the Internet (1); could be directed to allow communications between device 531 and an external device or application other than external device (8); or could be directed to allow communications between device 531 and another device or application present on local area network (5). In some examples, communication session 801 may be a TCP/IP session or other type or form of communication session.

In some examples session 801 may be allowed by the invocation of a token or code. In some embodiments the current invention may create and issue a security token or code that may be invoked by the user on their laptop or smartphone. The current invention could be pre-configured to allow temporary access to a specific device or application upon invocation of the token or code and use the codes to log access created using the codes and this method. For example, in one embodiment the current invention could issue a token to a user's smartphone, which may be invoked by means of a smartphone app. Upon invocation of the token, the current invention may associate the smartphone's IP address or MAC address or other identifying marker with a rule to temporarily allow access to a video streaming application resident on a IP video camera, so that the user may view the current video feed. In this example, the smartphone is protected from possible attempts by the IP camera to infiltrate or otherwise maliciously sabotage or compromise the smartphone because only packets related to the video feed would be allowed from the IP camera to the smartphone. Likewise, the IP camera would remain isolated from all communications other than those related to receiving requests for and sending the video feed to the specific smartphone that invoked the token. This configuration maintains security and could be further enhanced with the implementation of one-time-use tokens or codes, making it less dangerous to use them in environments where internet access is publicly available and credentials could be stolen, such as a coffee shop. There is a risk if someone physically steals the smartphone, however, such an event is beyond the scope of this patent, other than the current invention's ability to block access from specific MAC addresses and IP addresses (i.e., if the smartphone gets stolen, the operator can create a rule to disallow all access from the stolen device). In some embodiments, one-use tokens or codes could be valid only for a limited duration of time once invoked. After their expiration, the one-use tokens or codes would no longer function. In other embodiments, one-use or multi-use tokens or codes could have built-in expiration dates and expire on those dates regardless of whether the token had been used or not.

Next at 906 the process flow shows that communication session 902 between external device (8) and device 531 has been allowed. This communication may take the form of a TCP/IP session or some other method. It will be appreciated that the communication session between external device (8) and device 531 may be unrestricted, meaning that any type and duration of communications may be allowed between external device (8) and device 531, or the communication session may be restricted to varying degrees by time, duration, protocol, type or other parameter or characteristic.

Next at 908, the process flow includes a step for returning device 531 to its initial state, wherein in this example system (6) does not allow communications between ports 602, to which device 531 is connected, and port 601, which connects the Internet (1) via network source (2). Process flow 900 may be returned to its initial state by a specific command received from external device 8 (in the same fashion as initial communication 801); by the action of an automated trigger, such as a timed period of communication inactivity between external device 8 and device 531 or the lapsing of a preset length of time from the initiation of communication session 801 at step 904; or by some other manual or automatic mechanism acting upon or within system (6).

It will be appreciated that the initial state of device 531 could be other than as described at the beginning of process flow 900. It will also be appreciated that in other examples of process flow 900 the end state of device 531 could be different than the initial state, depending on how system (6) is configured. It will also be appreciated that process flow 900 could be used to enable alternate rule sets unrelated to external device 8.

There are several advantages to process flow 900, as compared to leaving a device or application on a local area network in a state where it has permanent access to the Internet or other external networks or other internal network locations and/or is permanently accessible from the Internet or other external networks or other internal network locations. Many situations, configurations and topologies do not require that a device or application located within a local area network have permanent accessibility to and from an external network, such as the Internet, or within the same local network. In those situations, to minimize the potential for security and other types of compromises, it would be desirable for the device or application to only have accessibility to an external network or other devices within the same local network when that accessibility is specifically required. At other times accessibility may serve no purpose, but may make the device or application more vulnerable to unauthorized access.

Process flow 900, however, not only restricts accessibility in terms of time, but also in terms of breadth. For example, through process flow 900 the current invention could be configured to only allow a narrow, restricted channel of communications between the device or application on the local area network and the external network, namely, those communications between a specific external device and a specific internal device or application (external device 8 and device 531 in FIG. 8). In allowing this specific channel of communication, device 531 is not exposed to a broad swathe of general communications from the external network, but only a narrow subset from a specific external device as allowed by the current invention. This greatly reduces the chances that the device or application on the local area network could be hacked by unauthorized parties remotely, in part due to the limited amount of time that the device or application has any accessibility to the outside network and in part due to the restricted nature of the communications that are allowed during that limited time frame.

Figure 9:
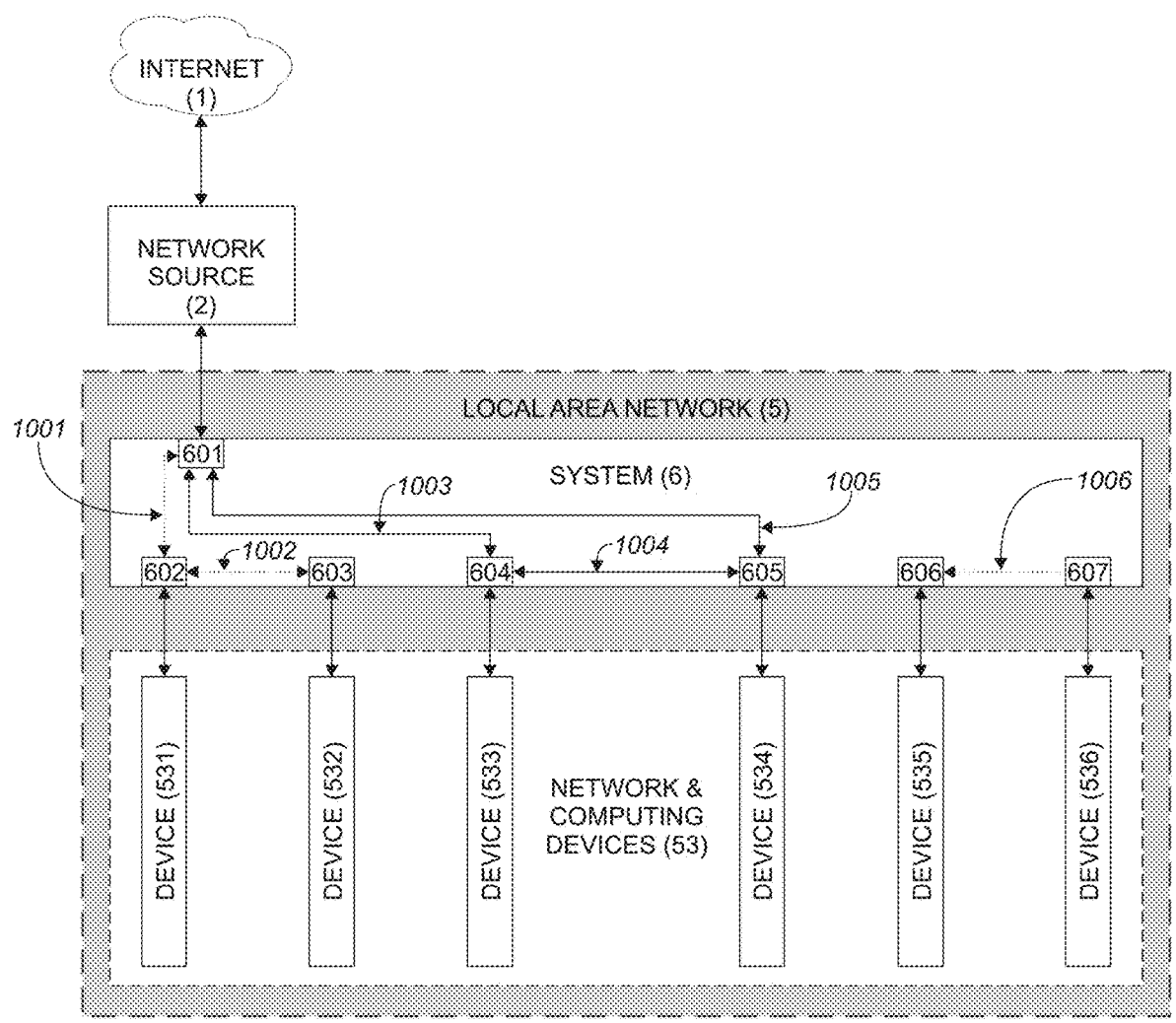
FIG. 9 illustrates examples of how the current invention (identified as system (6)) could limit network traffic to and from separate devices and applications on an individualized basis.

FIG. 9 illustrates several examples of how system (6) may individually process network traffic for network and computing devices (53) on the local area network (5). In this figure port 601 of system (6) connects to the Internet (1) via network source (2) and devices 531, 532, 533, 534, 535 and 536 connect to system (6)'s ports 602, 603, 604, 605, 606 and 607, respectively. The solid and dotted lines within system (6) indicate virtual internal "links" over which packets are allowed traversal between the devices and applications connected to system (6).

In one example devices 531 and 532 are allowed limited bidirectional communications with each other via link 1002, but not with other network and computing devices (53) on local area network (5). Device 531 is allowed limited bidirectional communications with the Internet (1) via link 1001, however, device 532 has only one allowed link (link 1002 with device 531). A configuration similar to this could be of use with a network-connected device, such as a VoIP telephone set, which would only be allowed limited network traffic with its network neighbors, such as DNS-related packets, and limited web traffic, for example, such as SIP and RTP packets in order to connect via the public internet to a specific VoIP server and make and receive VoIP telephone call-related traffic. Devices and applications elsewhere on the LAN could likewise be allowed only limited communications with the VoIP telephone set, for example, in order to check or change configuration settings. In this fashion, it would be very difficult for malicious actors to hack into the VoIP telephone set either remotely or via a local device, as the VoIP telephone set's communications would be locked down to just the type needed in order to fulfill its primary function (i.e., placing and receiving telephone calls). Further, should the seemingly innocuous VoIP telephone set be harboring malware, this malware would be unable to "call home" to a hacker's command-and-control server. Additionally, any such malware could be hindered from spreading to other devices on the LAN by the limitations configured into the current invention's handling of the device's communications traffic.

In another example devices 533 and 534 are allowed unlimited bidirectional traffic with each other via link 1004 and unlimited bidirectional traffic with the Internet (see links 1003 and 1005). These two devices, however, are not allowed any communications with the other devices connected to system (6). It should be noted that while these other devices are shown as connected via ports 602, 603, 606 and 607, the port numbers (i.e., network interface) is one of many type of data that may be utilized during the operation of the current invention, and that the actual network interface number may not be utilized at all as individual devices and applications may be identified by IP address, MAC address or some other packet criteria rather than a physical port. The port numbers in this and other figures are labeled for convenience, but do not indicate any necessity to the current invention's packet processing. While devices 533 and 534 are allowed to freely communicate with each other and with the Internet (1), they are in effect isolated entirely from the other devices and applications on local area network (5).

In a third example device 536 is allowed to send limited unidirectional communications to device 535 via link 1006. Neither device is allowed communications with any other devices on local area network (5) or with the Internet (1). It will be appreciated that such a link could be entirely unidirectional or could be unidirectional for the purposes of establishing a communication session; i.e., device 536 could initiate communications with device 535 and 535 would be allowed to respond, however, device 535 would not be allowed to initiate a communication session with device 536. A configuration like this could be used to allow an inexpensive IP camera access to a video server, for example, in order to stream the video feed. No communications, however, would be allowed between the IP camera and any other devices and applications on the LAN. As with the first example, the types of communications allowed could be limited in nature, in this example solely for the purpose of streaming the video feed from the IP camera to the video server. Again, similar to in the first example, the restricted nature of the communications allowed to either the IP camera or the video server would make it impossible for either to be accessed externally or to access the Internet or other external network themselves, increasing the security of both devices and hindering their ability to compromise other devices on the LAN, should they become (or already be) infected with malware.

In a fourth example, regardless of other restrictions on individual and general communications, the current invention could be configured to allow all packets identified by the network time protocol, regardless of source or destination. By allowing packets with this protocol, it makes it possible to allow the traversal of packets related to network time protocol without specifying a specific time server.

These four examples are illustrative, but by no means exhaustive, of the various ways in which the current invention may control, redirect, monitor, filter, block, restrict, shape and otherwise process packet-based communications. In other examples not pictured the current invention could redirect network traffic based on packet header and content-based criteria, or based on time and date scheduling, or as directed by an operator/user; individual devices/applications or groups of devices/applications could be segregated in part or in full from other devices/applications on a LAN; and different access rules and controls could be scheduled to apply at different times of the day, days of the week or specific time ranges or such a change may be automatically triggered by the characteristics and/or content of the packets traversing through the current invention or manually effected by the user/operator.

As described through the above examples and the process described as process flow 900, the current invention allows users to set up internal and external boundaries for different applications and devices. These boundaries may be fixed or dynamic. Returning to the example of the VoIP phone, a combination of fixed and dynamic boundaries implemented on the current invention combined with process flow 900 enhances both the security and usability of the VoIP phone. While the user may not wish the VoIP telephone set to be generally available and addressable by all devices and applications, in most circumstances it would be desirable to always allow communications to and from the VoIP carrier's VoIP servers. Additionally, it would be desirable to separately allow the VoIP phone the ability to connect to a time server using network time protocol (whether the time server is provided by the VoIP carrier or not). Lastly, process flow 900 could be utilized to make it possible for the user to connect to the VoIP phone from an external location, for example, to access the VoIP phone's call log or change its call forwarding, do-not-disturb or other settings.

Users could also use the steps described in process flow 900 with various tokens, with each individual token configured for a different purpose. For example, while one token could be invoked a rule change to allow access a VoIP telephone as described above, other tokens could be utilized for other purposes, for example, to access or restrict other devices or applications.

FIG. 10 illustrates a more detailed view of an example of system (6). System (6) may include memory (not pictured) executable via a processor (not pictured), as well as internal storage 4601 via hard drives (HDDs), solid state drives (SSDs), flash drives or other types of computer, digital or electronic storage media. In some examples, additional processors, memory or storage may be utilized to increase and in some cases maximize its throughput, packet processing or storage capabilities. System (6) may further include logic for DHCP and NAT routing (1600), as well as logic for switching fabric. System (6) may further include packet processing rules and virtual data processing and storage resource units ("VDPSRUs") for conducting the monitoring, sorting, filtering, blocking and other processing of packets. Although in this example DHCP and NAT routing is placed in this illustration prior to processing rules and VDPSRUs, it will be appreciated that it could be placed after the rules and VDPSRUs in the packet processing flow. System (6) may include feedback links from the VDPSRUs to both the rule sets and DHCP/NAT routing logic, allowing for dynamic modification if desired.

It will be appreciated that network data (packets) may arrive at port 601 as shown in this example, or at any of the current invention's ports designated for receiving network packets and that the network flow may be unidirectional or bidirectional. It will be appreciated that separate network interface ports may be designated for receiving management traffic or network interface ports may be configured to receive both management and regular network traffic. The current invention may be configured to receive and record the data in its entirety, which may include packet headers and packet payloads.

From incoming port 601 data may be processed for DHCP and NAT routing and then processed through one or more rule sets (see links 1101, 1102, 1103 splitting traffic among three rule sets, 2601, 2602 and 2603). As directed by the rules in the rule sets, the individual packets in the data may be sent to one or more VDPSRUs (see links 2101, 2102 and 2103 to VDPSRUs 3601, 3602 and 3603). As shown in this example, a copy of the data may be sent to internal storage 4601 (see links 3102, 3104 and 3105 to storage 4601). In some embodiments, storage could be provided externally. Also as shown, after processing through the VDPSRUs the packets may be sent out via port 602 (see links 3101 and 3103 to port 602).

The current invention's rule sets may include rules for positive matches or negative matches on a number of parameters, including but not limited to destination and origination IP addresses or IP address ranges, destination and origination MAC addresses or MAC address ranges, destination and origination ports or port ranges, protocol, frame size, destination and origination VLAN and destination and origination VLAN2. Rule sets may also include signature, protocol or keyword-matching rules. Rules may examine just the packet header or also the packet payload. Rule sets may also include rules that, rather than examining each packet individually and discretely, examine streams of packets in relationship to each other, for example, to find recurring characteristics or sequences of characteristics or patterns (such as a packet with characteristic A followed by a packet with characteristic B).

The current invention's VDPSRUs may include a number of parameters for processing the packet data that they receive according to their associated rules and rule sets. Whereas the rules and rule sets direct which VDPSRUs the packets go to, the VDPSRUs direct how the packets are processed and whether they are passed to storage, another VDPSRU and/or allowed to be sent out from the current invention and/or re-directed. VDPSRUs may be configured to maintain a counter of matching packets (i.e., the packets that match the rules associated with the individual VDPSRU) and/or maintain references to the packets, if stored; direct the packets to be stored (in internal storage 4601, see links 3102, 3104 and 3105) and further transmitted (out of the current invention via port 602, as illustrated by links 3101 and 3103); direct the packets to be stored but not further transmitted (as illustrated by the presence of link 3105 to storage 4601 from VDPSRU 3603 and no link to port 602); and direct the packets to be further transmitted but not stored. If a VDPSRU is set to maintain a counter of matching packets, it may be configured with a trigger linked to the packet counter that triggers when a certain packet count is reached and then resets to zero (to start counting packets again until the next trigger count is reached). This trigger may be set to cause one or more actions, including but not limited to sending messages and/or alerts via email, HTTP or another messaging or communication method, creating a log entry, changing rules/rule sets, engaging additional VDPSRUs or modifying the packet processing behavior of a VDPSRU.

The VDPSRUs may also have feedback links going back to either the DHCP/NAT routing logic (see links 1001, 1002 and 1003 in FIG. 10) or to the rule sets (see links 2001, 2002 and 2003 in FIG. 10). These links may be used to alter the behavior of the DHCP/NAT routing logic or the rule sets based on trigger events or a time of day, day of week, day of month, day of year or absolute time schedule ("absolute time" means a schedule with a start time and end time of specific times on calendar-specific days rather than a daily or weekly recurring schedule). For example, via the feedback link, a VDPSRU could toggle between different rule sets, enable a previously inactive rule set and associated VDPSRU(s), or disable a previously active rule set and associated VDPSRU(s).

In addition to processing existing packet data (such as copying and storing or redirecting packets), VDPSRUs also have the ability to create new data and/or modify existing data. VDPSRUs may collate information concerning network activity and generate new data. For example, a VDPSRU may be configured to gather, collate and report information on bandwidth utilization or packet rates over time. Alternatively, a VDPSRU may be configured to aggregate data packets or their metadata and examine them to find common characteristics and content, such as origination and destination IP and MAC addresses, protocol, VLAN, VLAN2, size, keywords and other parameters, and then tally up how many data packets correspond to each common characteristic or content. For example, one VDPSRU may be configured to pull out all of the origination IP addresses from its stored or linked data packets and tally up how many data packets correspond with each origination IP address, while another may do the same for destination IP addresses.

A VDPSRU may also be configured with a system of triggers and chained actions to create new information or change existing information, for example, by toggling a switch that enables and disables other elements or by making notations in a log.

Figure 12:
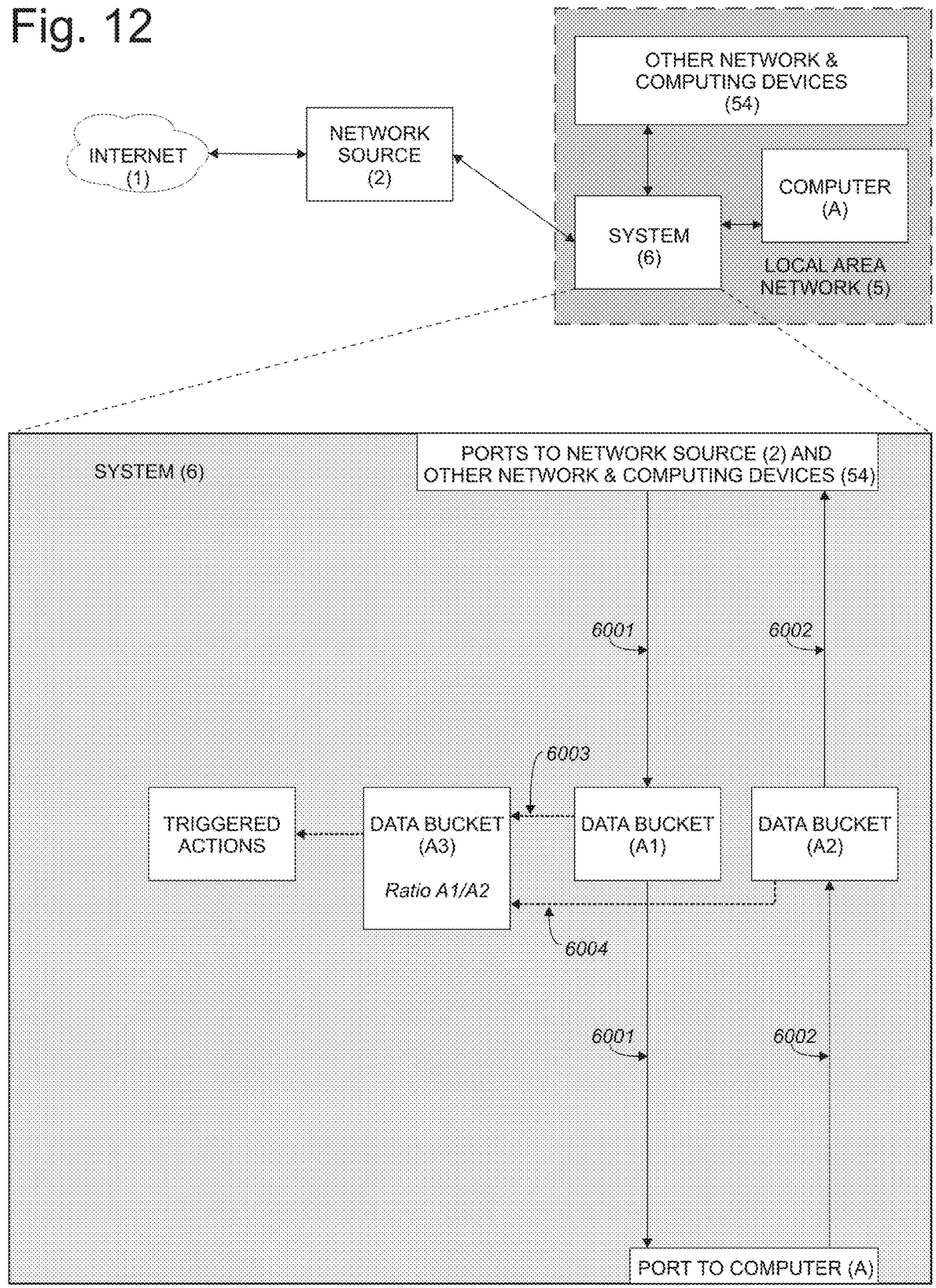
FIG. 12 shows an example of a configuration in which multiple VDPSRUs work together to create new information.

A VDPSRU may be also configured to work with and create new information in conjunction with other VDPSRUs. For example, FIG. 12 shows an example of a network topology incorporating system (6), which is connected to computer (A) in such a fashion that all of computer (A)'s communications traverse system (6). System (6) is also connected to network source (2), which is in turn connected to the Internet (1) (which as in other examples may stand in for other types of external networks or a larger LAN of which local area network (5) is a subset). Also connected to system (6) are other local computing and network devices (54), which for simplicity are grouped into one symbol in this figure. FIG. 12 also includes an inset detail of the packet processing configured in system (6) with regards to computer (A). As shown in this example, VDPSRU (A1) collects and/or monitors computer (A)'s incoming data stream and VDPSRU (A2) collects and/or monitors computer (A)'s outgoing data stream (for simplicity, in this inset graphic the NAT/DHCP routing, rule set and storage elements illustrated in FIG. 10 have been omitted, as well as depictions of the packet traffic for other devices). Data entering system (6) intended for or received from Computer (A) are sent through separate VDPSRUs and then sent on to their intended destination. Computer (A)'s incoming packets are sent along link 6001 through VDPSRU (A1); Computer (A)'s outgoing packets are sent along link 6002 through VDPSRU (A2). The VDPSRUs monitor and collect data on the bit rate and packet rate of the packets passing through them, in this case, the incoming and outgoing communications for Computer (A). It will be appreciated that bit rate and packet rate monitoring are just two examples of the many types of information, data and activity that the current invention could monitor and collect data on.

Using the data collected by VDPSRUs (A1) and (A2), the current invention may create new information about the ratio of incoming to outgoing packets and act upon it. As shown in FIG. 12, VDPSRUs (A1) and (A2) send data via links 6003 and 6004 to a third VDPSRU, (A3), through which VDPSRU (A3) receives data that it can use to calculate the upload/download ratio for computer (A). In generating this ratio, the current invention is creating new information that could be further utilized, for example, to monitor whether the ratio rises above or falls below certain values. In this way the current invention becomes more intelligent, with the ability to create new information that is both useful in and of itself and could be acted upon in a way not possible prior to the creation of that new information. Returning to the example in FIG. 12, actions could be triggered should the ratio calculated by VDPSRU (A3) match certain criteria.

By chain-linking this creation of new information (for example, by sharing the created information with other VDPSRUs), further additional new information could be created and acted upon, effectively giving the current invention the ability to make intelligent decisions and guesses as to what needs to be done and when, as well as providing a high degree of automation for repetitive and non-repetitive processes. Returning to the example illustrated in FIG. 12, two VDPSRUs, (A1) and (A2) gather information and learn about computer (A)'s bandwidth usage. A third VDPSRU, (A3), puts together this bandwidth information to create a ratio of computer (A)'s incoming to outgoing communications. From this ratio, system (6) could create additional new intelligence, such as, if incoming communications are higher than the outgoing communications it could mark a device as most likely a computer used by a human user. In the alternative, a higher outgoing bandwidth could indicate that a device is most likely a server. These ratios could be further gathered and used over time to learn about normal patterns and to detect when these ratios fall out of the normal observed range. To this it is also possible to add timing elements and the correlation of data across multiple VDPSRUs to create yet more new information that can be leveraged for monitoring, alerting, diagnostics, controlling and other purposes. This is of great use in a setting with industrial automation and controls, particularly if unmanned.

Figure 11:
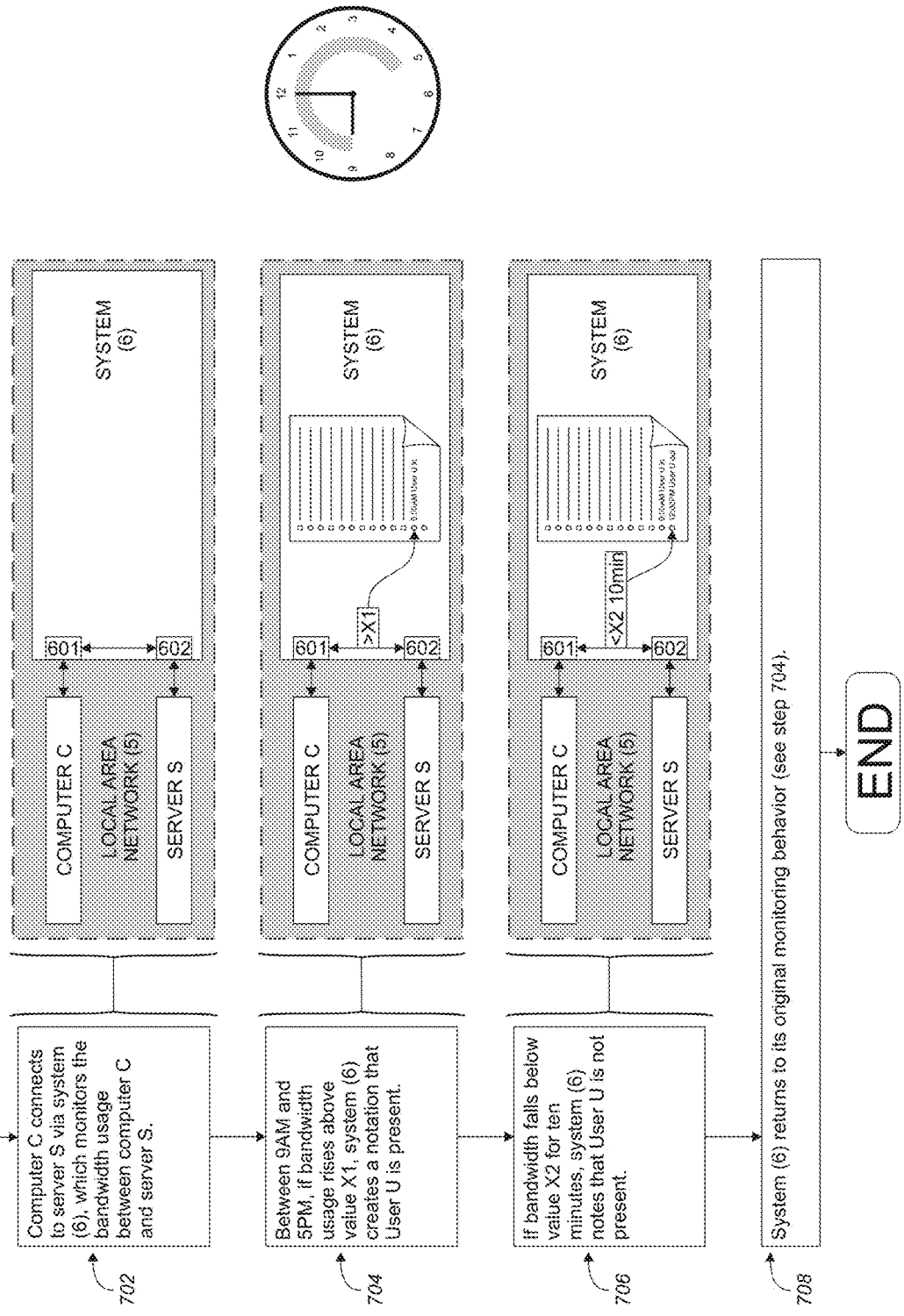
FIG. 11 shows a process flow whereby the current invention (identified as system (6)) could create information, in this example detecting conditions and making notations based on those conditions.

FIG. 11 shows process flow 700. In this example a local area network (5) includes computer (C) and server (S), which are connected through and monitored by system (6) (illustrated at step 702). In this example, a VDPSRU-rule-trigger combination monitors the bandwidth usage between computer (C) and server (S). When at step 704 the bandwidth usage between these two devices rises above a certain threshold (X1) on weekdays between 9 AM and 5 PM, it triggers a log notation (such as the deduction that user (U) is present at computer (C)). This trigger also toggles a switch, changing the monitoring behavior of the VDPSRU-rule-trigger combination so that when the bandwidth between the two devices falls below a certain level (X2) for a pre-set length of time (in this example, ten minutes, see step 706). At this step, the trigger causes a different log notation (such as user (U) is not present at computer (C)). After this, at step 708 system (6) switches the VDPSRU-rule-trigger back to its original behavior. It will be appreciated that bandwidth usage is one example of the many observable conditions that system (6) may monitor for in the packet data and from which it may create deductions and extrapolations about events that take place external to the bits and bytes of network communications. Further, it will be appreciated that a log notation or email alert is just one of the many triggered actions that system (6) may initiate in this example and in other situations.

In addition to creating data by making a notation, the current invention may also engage additional functions to enable different applications or enable different or additional monitoring. These additional functions and monitoring may vary depending on the type of notation or its content. For example, the current invention may engage monitoring to detect keywords or signatures in the flow of network packets (to and from computer (C) or other equipment, depending on configuration). Rules and different types of packet processing may be engaged to leverage the information created in order to augment the current invention's packet processing behavior in order to gather, learn, create and/or act upon more information; to change preexisting information; to generate an action or sequence of actions based on the information created; control equipment (by controlling its network communications); and/or to present information to the current invention's operator as part of a decision-making process. Although the specific notation made through example process flow 700 in and of itself may be of limited value, it may initiate a sequence of actions or decision-making process that would lead to the creation and/or discovery of additional data and in specific or in aggregate may produce a result (such as a specific action or behavior) desired by the operator based on the conditions precipitated by the initial notation.

Building on the example of FIG. 11, on weekends and outside of the hours of 9 AM to 5 PM during the workweek, the VDPSRU-rule-trigger combination could be scheduled to switch to monitoring for abnormal network traffic. For example, it could trigger the sending of email alerts should the bandwidth usage between computer (C) and server (S) rise above a pre-set threshold. It will be appreciated that bandwidth usage is one example of the many observable conditions that system (6) may monitor for in this example and in other situations. Other detectable conditions may include but are not limited to the sending of packets with protocols (such as SIP and RTP for VoIP-based telephone calls, SMTP and POP for email, network management protocols such as SNMP; and other protocols) and other characteristics typically only used during the day; packets with abnormally large frame sizes; packets with suspicious external or internal destination IP addresses; and so on. Further, it will be appreciated that an email alert is just one of the many triggered actions that the current invention may take in this example and in other situations. Other actions may include engaging full packet capture on computer (C)'s network communications; restricting or disabling computer (C)'s LAN or Internet access; creating an entry in an event log; and so on.

In another example, a VDPSRU may be configured to toggle a switch when a triggering event occurs, not just to change its own behavior, but also to change the behavior of other VDPSRUs.

As described above and illustrated by example in FIGS. 11 and 12, the VDPSRUs may gather and collate intelligence in the form of data packets or other types of information and/or VDPSRUs and/or create information in the form of log entries and similar and act on it according to a set of triggers and actions. It may further create patterns of data processing by virtue of a chain or sequence of linked actions, whereby one triggered action may lead to another based on criteria set by the operator. In a further example, one triggered action may cause another action (or multiple actions) to occur or toggle a switch or group of switches (that enable or disable various VDPSRUs, rules, triggers and other elements), but only on the "nth" instance of the triggered action, for example, after 10 occurrences of the specified event. Actions may include, but are not limited to, log notations, the sending of emails, the enabling/disabling of rules and/or VDPSRUs, report generation and the cessation, resumption or initiation of packet recording and/or packet blocking.

As described above and throughout this document, the current invention's rules, VDPSRUs, triggers and other elements enable it to detect both simple and complicated network conditions, create information both directly from the packet data and through deduction and extrapolation from the packet data and react to network events and conditions, including taking actions to shape and alter network traffic. These elements and abilities allow the current invention to also act as an overseer and affect the functions of external equipment, whether directly connected to the current invention (via USB, Ethernet or other type of connection) or connected via a wired or wireless network, regardless of whether the external equipment has been designed or modified to interact with the current invention by executing a chain of actions, such as sending a command via http, e-mail or other protocols; changing a logic switch; modifying VDPSRUs and/or rules; and/or sending command via USB and other methods.

Traditionally communication devices such as routers, switches and firewalls acted exclusively as carriers and routers of information; they either route it or don't route it. While the current invention may route packets, instead of acting merely as a communication device that passes data from point A to B, the current invention oversees, learns from and controls the communications of external applications and devices in order to achieve a desired result. The current invention, through its logic and capabilities, creates and/or modifies the functionalities of other applications that use those communication channels in order to effect the results desired by the operator or network administrator. Through its control over communications it may enhance or adapt the overseen applications and devices to changing environments, roles, performance conditions and other needs. Rather than just a messenger or courier, this device becomes overseer and master of the communications through which can be implemented the wishes of the end-user without having to modify the applications and devices being overseen. Some of these may be complementary or even contrary to the overseen application's original functions.

It will be appreciated that many of the computing devices, industrial controls and other equipment and applications on computer networks frequently rely on network communications for much of their operations. Many of these applications and equipment, particularly in industrial, enterprise and government settings, may be custom-made equipment and applications designed for a specific purpose and location, meant to be in use for years (and in actuality in use for decades). Many, if not all, may run disparate computer code written by different developers at different times, which makes it difficult (if not impossible) and time- and cost-prohibitive to bring coherency to the equipment and applications and/or to change and update them. Through their use of the communication networks for their operations, however, the current invention is able to take on the role of overseer over these applications and equipment and glean information on what the application or equipment is doing, what it is likely to do next and what the expected result would be. In overseeing the applications' and equipments' communications, the current invention would be able to gain control over the application/equipment without requiring modification to the application/equipment itself by moderating and modifying the application's/equipment's communications in such a way as to affect its behavior or send communications to other, possibly new, devices that would in turn affect the application's/equipment's behavior and produce a desired result. Effectively, when used in this way the current invention substantially reduces the cost to the end-user by removing the need to go through a costly overhaul of other existing equipment and/or applications in order to adapt them to operating in a different networking environment or with different networking or computing devices than that for which they were originally designed. Through the same process, use of the current invention could achieve other desirable benefits, such as reduced down time, less need for technical support and increased operational security.

Figure 14:
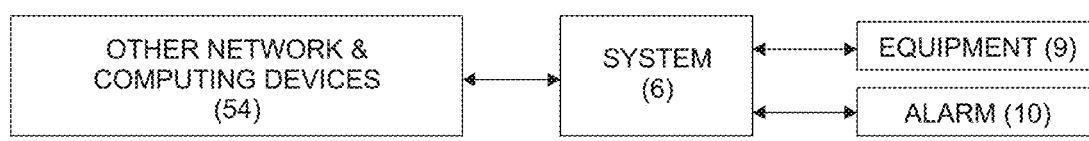
FIG. 14 illustrates how the current invention may interface with external output devices, such as alarms.

For example, a factory (or other location) may have a computer-controlled equipment for which it would be beneficial to have an alarm if certain errors occur. The equipment, however, did not originally have such an alarm programmed into it and it would be too expensive to add such an alarm to equipment after the fact. As illustrated in FIG. 14, by introducing the current invention (referred to as system (6)) into the network topology so that all communications to and from equipment (9) would pass through and be overseen system (6), it may be possible for system (6) to observe equipment (9)'s network communications and from it deduce error conditions. When such an error condition is observed, system (6) could trigger certain pre-programmed actions, including interfacing with and causing an external alarm (10) to go off.

Should an error condition be caused by other network and computing devices (54)'s communications to equipment (9), system (6) could take actions, when the error-causing communications are observed and detected, to modify the communications before they reach equipment (9) to prevent such an error condition from occurring in the first place.

In another example is a device that was designed for use in the low packet rate environment that was in existence at the time the device was originally installed. While its packet rate capability was sufficient when first put in service on a low-speed network, networks tend to change and speed up with time. Years later the device may periodically crash when it gets overloaded by a packet rate that is too high for it to handle. The current invention could address this problem by overseeing the device's communications and correcting any potential packet rate or bit rate overload by moderating the communication rate to the device in question or dropping or delaying traffic in order to safeguard the device from communication overload.

In a third example, it may be desirable to log the actions of an application that does not itself have logging capabilities. As overseer, the current invention could observe the application's communications and log the application's actions based on the type, content, destination or other characteristics of the communications.

In a fourth example, the current invention could observe a situation where an application's or device's traffic rate should be X, but instead has dropped below X. In that situation, in its overseer role, the current invention could cause another auxiliary device, such as a power switch, to toggle the power to the device and trigger a reboot. This auxiliary device could be connected to the current invention directly or via a communication network (USB, Ethernet, LAN, WAN and etc) and the current invention may send a command to the auxiliary device, for example utilizing HTTP or email protocol or other protocol or method. The current invention could further observe the results of the reboot (did the traffic rate return to X?) and trigger another reboot if the first did not achieve the desired results, either after a delay or immediately. The current invention may cease further triggering reboots after a certain number of reboots if the reboots have not achieved the desired result and instead leave the malfunctioning application/equipment in a powered off state and/or send an email alert, trigger a visual or audio alarm or take other pre-programmed action as desired by the operator. In tracking the results of reboots and the number of reboots, the current invention uses its intelligence and observational capabilities to achieve a desired result (i.e., either restoration of the application/device to its normal operations or the triggering of an alert or alarm if the attempt at restoration fails).

In many cases using the current invention's intelligence gathering, intelligence creation and action capabilities to operate these overseer functions would be easier and cheaper to program than attempting to modify an application or equipment to incorporate such functions. The current invention could handle overseer functions for multiple devices and applications, spreading the cost of the current invention over a wider number of operations, rather than implementing numerous specialized devices for each individual device or application.

While for a human an action such as rebooting a device is trivial (just reach out and press a button), for the device itself it could be insurmountable. With the current invention, however, it becomes a trivial process because the current invention is able to intelligently observe communications and take action within parameters set by the operator/user.

In some embodiments, the current invention could include functionality allowing it to interface to external switches, lights, activators and other similar devices and control or influence their behavior based on packet events, network conditions or other characteristics of the data collected and/or processed by the current invention or accept input from those external devices. For example, a USB keypad with indicator lights could allow a user a way to quickly disable a network interface port or other function, without having to log in to the web-based user interface; the indicator light(s) could be used to indicate the state of the function thus controlled. In another example, the current invention could cause an external visual, audio or other type of indicator to illuminate, blink, change color, chime, beep, trigger an alarm or create some other type of indication that the current invention has detected a certain event or condition. This functionality could be of great help in a test environment or software debugging environment, where the user could set a trigger based on network conditions, packet characteristics or the receipt of a certain combination of packets or other event or data scenario and the external alarm or other type of indicator could quickly and easily alert them that the looked-for event has occurred.

In some embodiments the current invention may be configured to encrypt data prior to storage. Encryption of the data stored in the current invention may be implemented in the following manner in some embodiments. During boot times of the current invention, a unique key may be loaded from an external device, such as a Universal Serial Bus (USB) flash drive or other suitable device into the recording device memory (e.g., volatile memory). Volatile memory may include random access memory (RAM). The current invention may further be configured to operate using the key stored in memory. A user can either remove or not remove the external device with the key after the recording device boots up. If the external device including the key is removed and the current invention experiences a power interruption, the recorded data on the current invention may be inaccessible unless the external key is present, enabling loading of the key to memory when the current invention boots up. In this way, the integrity of the recorded data on the current invention would not be compromised regardless of whether or not the external key is present during a power loss or power interruption. Additionally, the removability of the external device with the key provides an additional layer of security, allowing the external device with the key to be removed and kept in a separate location from the current invention after the initial boot up.

In some embodiments the current invention may be configured to communicate with other instances of the current invention or other devices, such as a server, which may be located on the same local network or in a remote location.

In some embodiments, the current invention may incorporate and utilize a tripartite encryption system (or simplified two-party encryption system) for securely communicating and sharing data with other instances of the current invention or with other computing systems, such as a server. In this encryption system, one party distributes keys and encrypted data among two other parties in such a way that decryption of the encrypted data requires the cooperation of both of the two other parties and a mechanism for these two parties to confirm that the other is the correct party with whom to decrypt the data.

Figure 15:
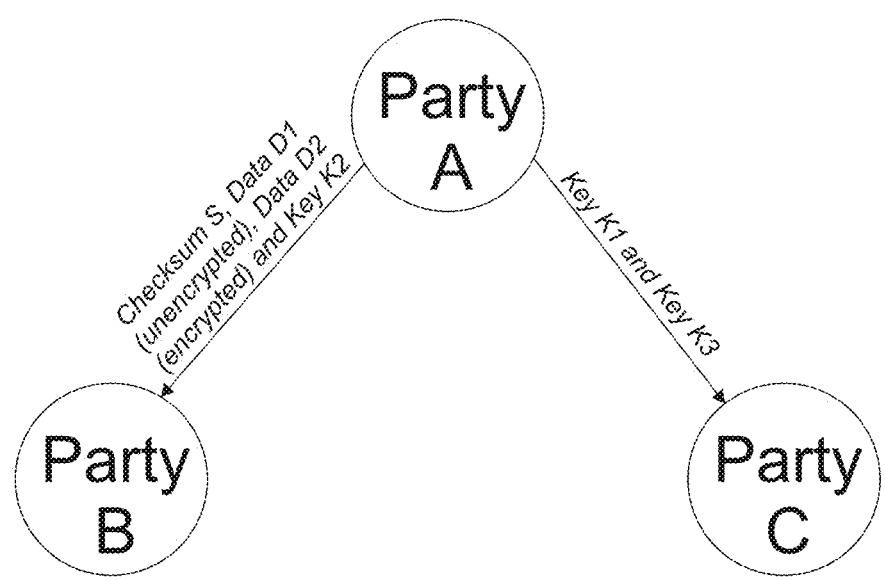
FIG. 15 illustrates how to set up tripartite encryption with three parties.

As illustrated in FIG. 15, to set up a way for Party B and Party C to authenticate each other, Party A generates a key K1 and encrypts a block of data D1 (which may be any random data) and then generates a checksum S of the encrypted data file. Party A then sends checksum S and data D1 (unencrypted) to Party B and key K1 to party C. Next Party A encrypts data D2 (the data meant to be secured) using keys K2 and K3. Party A then sends data D2 (encrypted) and key K2 to Party B and key K3 to Party C.

Figure 16:
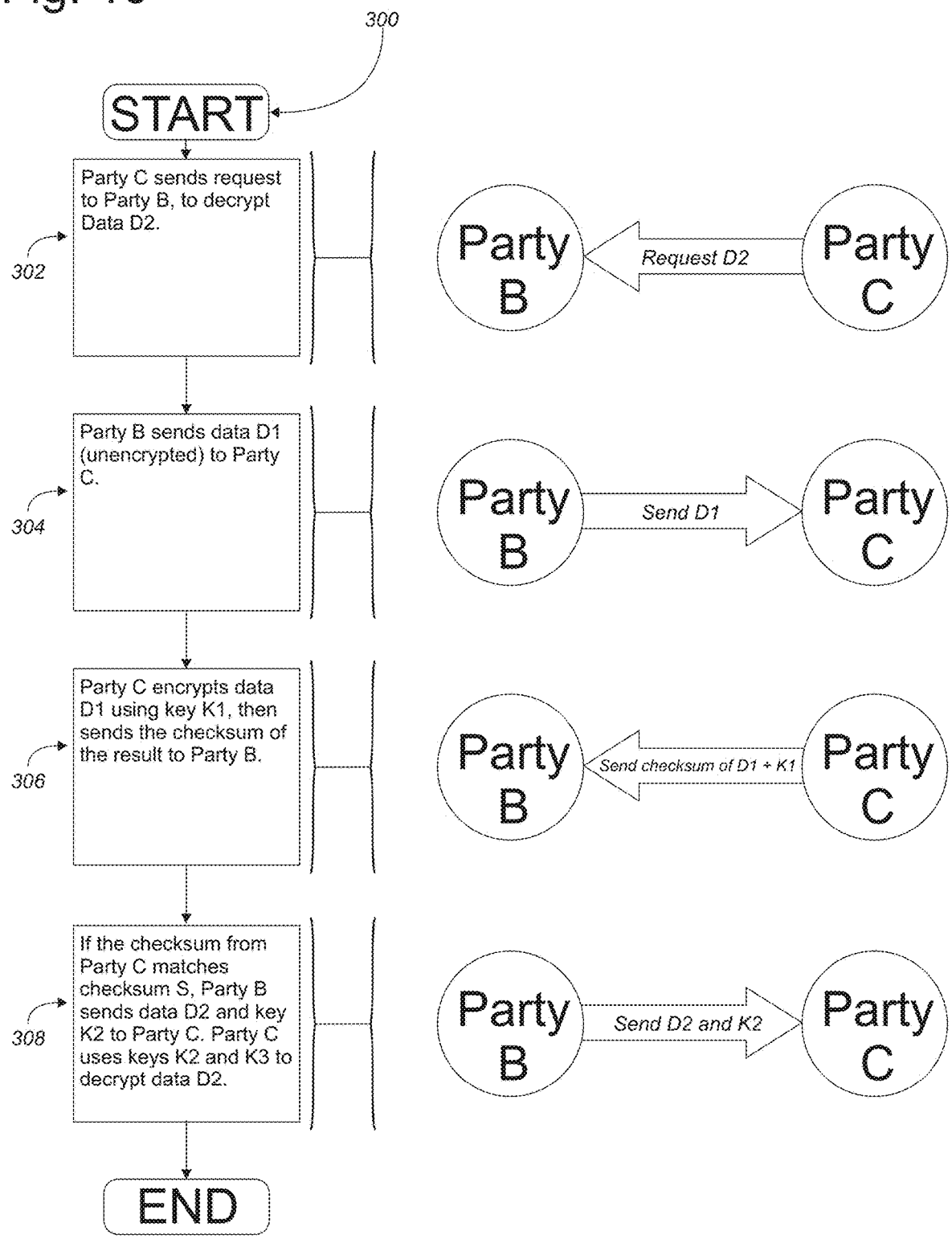
FIG. 16 illustrates a process flow for decrypting data that has been encrypted using the tripartite encryption method.

As shown in process flow 300 (see FIG. 16) at step 302, when Party C needs data D2, it contacts party B (how party B and party C identify data D2 is beyond the scope of this patent). In response, at step 304, party B sends data D1 (unencrypted) to party C. Using key K1, party C encrypts data D1 and generates a checksum of data D1 (encrypted). Party C then sends the checksum of data D1 (encrypted) to party B (step 306). If this checksum matches checksum S (which party B received from party A at the beginning of this process), party B will send data D2 (encrypted) and key K2 to party C (step 308), who would then be able to use keys K2 and K3 to decrypt data D2. In this fashion, party A has all the elements (keys and data), which it parcels out to parties B and C so that only together can parties B and C decrypt the data. Party C can get the encrypted data and other key from the second party, but only after authenticating itself to party B. Party B may handle the data with little fear of compromise because it only has one of the two keys required to decrypt the data. The keys used for this encryption method may be fixed or variable in length. In some embodiments the key may consist of an encryption algorithm and the data used by the algorithm to seed itself or the algorithm could be constant with the key consisting only of the "seed" data.

In some embodiments, keys K1 and K3 could be merged into one key.

In some embodiments data D1 and data D2 could be the same data, in which case party A would encrypt the data in two passes using key K2 and key K3 and send it to party C, along with key K1. Party A would then encrypt the data one more time using key K1 and send the checksum of the resulting data to party B. When party C needs to decrypt the data, it would encrypt it using key K1 and send the checksum to party B. If the checksum from party C matches the checksum party B received from party A, party B would share key K2 with party C so that party C could decrypt the data. Alternatively, if party B wishes to decrypt the data, it would send the checksum it received from party A to party C, so that party C could compare it to the checksum it gets after encrypting the data with key K1. If it matches, party C would send both the data (encrypted with keys K2 and K3) along with key K3 to party B.

In some embodiments party A and party C could be the same party, in which case, party A/C would have a mechanism to "forget" key K2 and data D2 after transmitting them to party B.

In some embodiments, Party A may also transmit the checksum of data D2, pre-encryption or post-encryption, so that party C would be able to verify that the received data is the correct data. This checksum would not be available to party B. In a scenario where party A and party C are one and the same, party A would simply save the checksum.

Further, in some examples, the current invention may be configured to operate autonomously. In other words it may not need human intervention to boot up (i.e., turn on) and initiate packet processing other than physically connecting it to a power source and/or connecting the current invention to a network source and the network and computing devices on a local area network. In this way, the functionality of the current invention may be automated.

In some examples, the data stored on the current invention's storage media may be divided into sections with checksumming. In the event of storage media failure, the corrupt data may be isolated and not compromise the rest of the data stored on the storage media. Further in some examples, when data is corrupted in the current invention the device may be configured to restore data on the storage device. Restoration of the data on the storage media may include matching the pattern using checksum sequentially and/or randomly in an attempt to find a pattern that matches. Once the current invention finds a matching pattern, it has found a valid chunk of data. For instance, the current invention may check the storage media sequentially, finding the first segment of data and then attempting to find the second segment. If it cannot find the second segment, it will continue further in the sequence. Once it finds the third segment it may deduce that the second segment is corrupted.

Further, in some examples, computing devices or applications external to the local computing network on which the current invention is installed may be inhibited from accessing the management features or retrieving (e.g., downloading) data directly from the current invention. In other examples it may be possible to configure the current invention to only accept management traffic from specific devices or specific IP addresses, whether located locally or remotely.

In some embodiments, the current invention could be coupled with other instances of the current invention and/or one or multiple data processing servers in order to increase available storage, available network interface ports, data processing capabilities and packet throughput or for other purposes, such as backup and redundancy. These data processing servers may connect to the current invention directly, via a LAN (local area network), via a WLAN (wireless local area network), via a WAN (wide area network) or via the public Internet or other type of network from a remote location.

As mentioned throughout this disclosure, the subject invention of this application may conduct packet processing at both per-device and per-application levels. For simplicity, most of the figures attached hereto do not break down to the application level. It will be appreciated that computing and networking devices may run more than one application, concurrently or at different times. Computers and smartphones, for example, are capable of running multiple applications that utilize network communications at the same time, and typically do. A VoIP telephone set, for example, may run domain name resolution, call management, user authentication, voice transport, directory service, network time and other applications. A simpler device, such as a temperature sensor may run an application to periodically send temperature readings to a server, while an industrial control may run an application to operate a conveyor belt.

Figure 13:
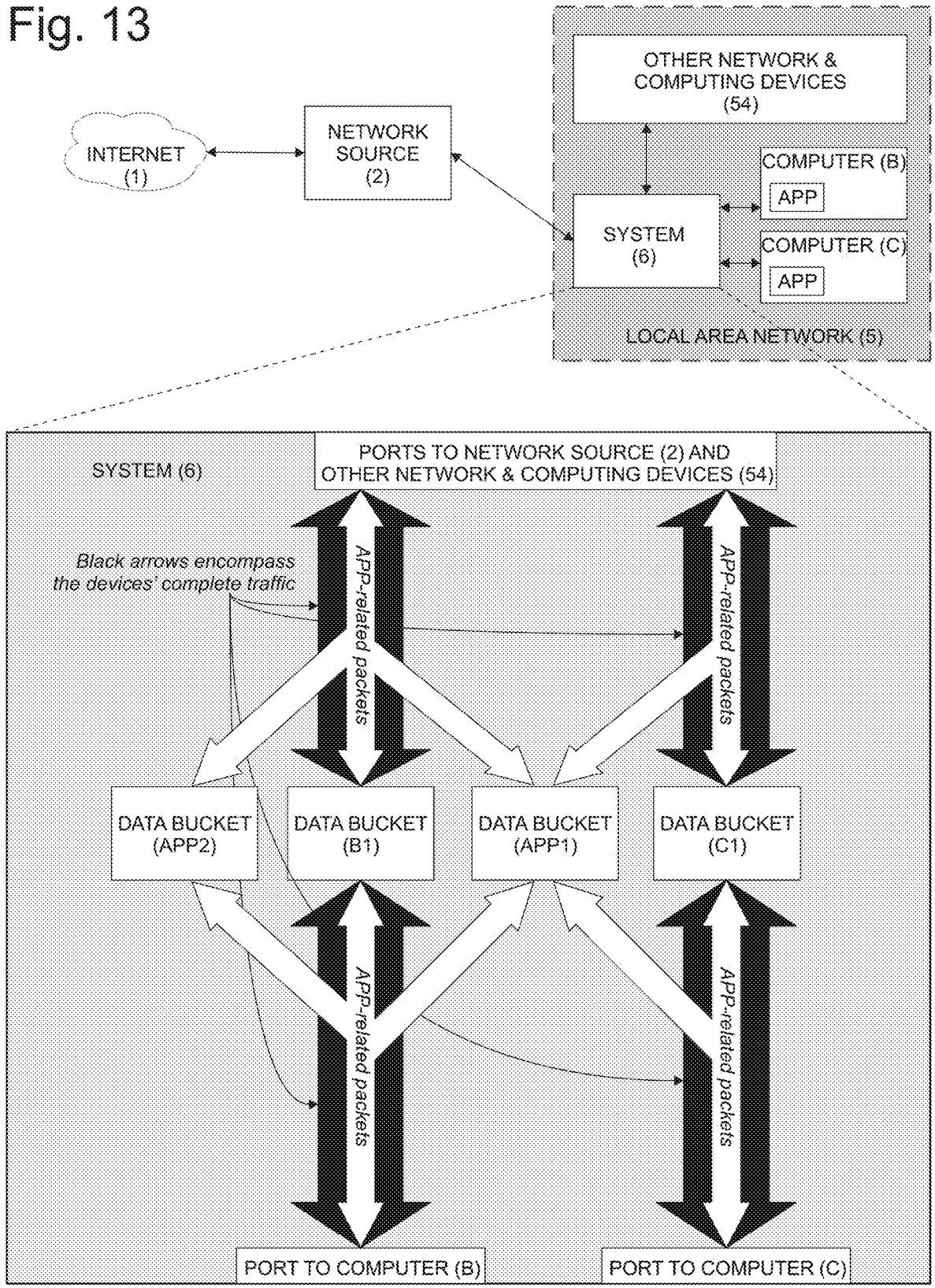
FIG. 13 shows how the current invention can process packets on both per-device and per-application bases.

To illustrate per-device versus per-application packet processing, FIG. 13 shows a network topology incorporating system (6), which is connected to computer (B) and computer (C) in such a fashion that all of computer (B)'s and computer (C)'s communications traverse system (6). Computer (B) and computer (C) are both running multiple applications, including application (APP), which utilize Computer (A)'s and computer (B)'s network connections. FIG. 13 also shows an inset detail of the logical packet processing configured in system (6) with regards to computer (B) and computer (C) on a per-device level and with regards to application (APP) on a per-application level. For simplicity, in this inset graphic the NAT/DHCP routing, rule set and storage elements illustrated in FIG. 10 have been omitted, as well as depictions of the packet traffic for other devices. In this example VDPSRUs (B1) and (C1) process packets for computers (B) and (C) on a per-device level, respectively. Within the data flows for computers (B) and (C), however, are communications pertaining to application (APP). The packets pertaining to application (APP), regardless of whether they originate from computer (B), computer (C), other networking and computing devices (54) or network source (2), are also processed at a per-application level through VDPSRU (APP1). The packets pertaining to application (APP) that originate from or are destined for computer (B) are also processed through VDPSRU (APP2). In this fashion, the communications of computers (B) and (C) are separately processed at a per-device level; application (APP)'s communications, regardless of source or destination, are processed at a per-application level; and the communications for the specific copy of application (APP) running on computer (B) are narrowed down both by device and by application. For example, the current invention could separately collect all packets pertaining to two computer's network communications, while at the same time commonly collect all email-related communications, regardless of origination and destination and also separately collect the email-related packets originating from or destined for one or both of the two individual computers.

It should be understood that the embodiments herein are illustrative and not restrictive.

The invention claimed is:

1. A network appliance comprising:
   (a) communication sub-systems for receiving and sending data packets via wired or wireless signals in a communications network;
   (b) electronic storage;
   (c) logic to capture data packets;
   (d) logic to extract metadata from said data packets;
   (e) logic to detect character strings in said data packets;
   (f) logic to store data packets and/or their metadata;

(g) capability to configure two or more instruction sets for:
  (1) identifying when and how to examine said data packets;
  (2) identifying when, where and how to store said data packets and/or their metadata;
  (3) identifying when and how to modify said data packets; and
  (4) identifying when, where and which of said data packets are to be sent;
(h) logic to simultaneously apply two or more of said instruction sets to said data packets and/or said metadata, with it possible for individual data packets to match and satisfy the requirements for more than one instruction set;
(i) multiple wired or wireless network interface ports for individually connecting external computing devices to said network appliance so that each individual computing device's communications traverse said network appliance before reaching any other external computing device or other electronic data destination;
(j) logic to route and/or switch data packets;
(k) facilities for a human user/operator to manually program and configure said network appliance and create or modify said instructions sets or rule sets;
(l) logic and facilities to collate and present data in human readable format;
(m) logic to correlate data packets for the detection, reconstruction and recognition of events, communication patterns, other patterns and relationships spanning a multiplicity of data packets, a multiplicity of communication sessions and/or variable lengths of time between said external computing devices and/or between a local area network or wide area network and said external computing devices or between computer applications or between servers and clients based on the sequence, volume, order, direction, characteristics and contents of a multiplicity of data packets traversing said network appliance over time and generate reports, lists and descriptions of the events, patterns and relationships found; and
(n) logic to extrapolate from the events, communication patterns, other patterns, conditions and relationships detected, reconstructed and recognized within the data packets to deduce events occurring external to said network appliance and said external computing devices, such as actions or inactions of human users operating said external computing devices or applications, autonomous actions or inactions of applications or other devices operating on their own (such as sensors, mechanical equipment, independently operating equipment or networking equipment), or the conditions, actions or inactions of other local or remote devices whose communications traverse said network appliance and make assumptions about their causes and possible results.

2. The network appliance of claim 1 where said data packets or a subset of said data packets may be aggregated, examined for common characteristics and content and tallied so that receipt of a new data packet matching said common characteristic(s) or content increments a counter associated with said common characteristic(s) or content.

3. The network appliance of claim 1 having logic to envelope one or more of said external computing devices or applications in a simulated alternate networking/communications environment other than the networking environment currently prevalent on the local area network through real-time monitoring and modification of the data packets received from and sent to said external computing devices or applications, such as alteration of data content, protocols, formatting and/or data rate or creation or removal of data content or data packets from the data stream to and from said external computing devices or applications.

4. The network appliance of claim 1 having capabilities to dynamically create new or invoke already-existing instructions sets to initiate or terminate the blocking, filtering, modification or recording of electronic communications to and from said external computing devices upon detection of certain characteristics, conditions, events, communication patterns and relationships between different computing devices and computer applications and LAN/WAN in the data packets and communications streams traversing said network appliance, including the detection of the presence of data packets from newly-connected external computing devices and/or new computer applications.

5. The network appliance of claim 1 where the instruction sets may include commands to automatically trigger an action, multiple simultaneous actions or a chain of actions, including sending email(s), sending text(s), generating visual or audio alert(s) or causing other equipment to do so, making notation(s) in a log file, creating new or modifying pre-existing instruction set(s), changing which instruction sets are active, changing the data rate, dropping packets and/or modifying packets upon the detection of a data packet or set of data packets with certain characteristics or content or of a preset volume of data packets matching certain characteristics or content over a period of time.

6. A system and method for remotely controlling data communications, authentication and access to one or more computing devices or applications using one-time-use codes comprising:
  (a) communication sub-systems for sending and receiving data packets via wired or wireless signals;
  (b) one or more wired or wireless network interfaces for connecting one or more external computing devices to said system so that each computing devices' communications must traverse said system before reaching any other external computing device, local area network destination or wide area network destination;
  (c) logic for routing or switching data packets;
  (d) memory comprising code executable by a processor with:
    (1) logic to capture, decode and parse the data packets traversing the system in any direction, extract their metadata and identify their characteristics and content for the purpose of detecting specific markers or character strings, such as tokens or codes;
    (2) logic to manually or automatically create instruction sets or rule sets for describing the content and characteristics of data packets; and
    (3) logic to manually or automatically create instruction sets or rules sets for allowing or disallowing the traversal of data packets with specific characteristics or content through the system;
    (4) logic to generate single or multiple one-time use codes and associate them with specific instruction/rule sets, with the following characteristics:
      (i) may be of fixed or variable lengths
      (ii) may be composed of alpha-numeric characters and so-called "special characters" (e.g. !, #, $, % and so on)
      (iii) valid for one-time use only
      (iv) may be associated with a specific user or device;

(5) logic to invoke one or more instruction sets or rule sets upon detection of packet(s) with said associated marker, character strings or codes;

(6) logic to log the access granted by means of said codes within this method;

(e) electronic storage;

(f) facilities for a human user/operator to manually program and configure said computing system and create or modify said instructions sets or rule sets, including the ability to partially configure alternate instruction sets or rule sets containing instructions or rules for allowing full or limited access to one or more of said external computing devices or an application running on said external computing device(s) from an unspecified computing device, which may be located on the same local area network or a wide area network location, and associate a one-time use code or sequence of one-time use codes with said instruction set or rule set; and (g) a process for user to remotely complete said partially configured instruction sets or rule sets and specify a remote computing device on a local area network or wide area network for which to allow access without logging into or directly accessing said computing system, comprising the following steps:

the remote computing device sends a communication or packet(s) containing a one-time code to said computing system from an originating local area network or wide area network location which the user would like to specify as the location with which to complete said partially-configured instruction sets or rule sets;

(2) system receives said communication or said packet(s) and, if the code is correct, completes said partially configured alternate instruction sets or rules sets by using the originating remote computing device of said communications or packet to specify the previously unspecified remote computing device from which to allow access, or, if the code received is incorrect, the system ignores the communication or packet and takes no further action;

(3) system enables the now-completed alternate instruction sets or rules sets; and (4) a pre-set lapse of time, period of inactivity or receipt of a second communication or packet(s) with a one-time use code from the remote computing device may trigger system to disable said alternate instruction sets or rule sets and revert said alternate instruction sets or rule sets to their initial partially-configured state.

7. The system and method of claim 6 further comprising pre-existing fully-configured alternate instruction sets or rule sets which may temporarily or permanently be enabled or disabled by sending within the proper sequence, if required, a communication or packet(s) with a one-time use code to said system and which may cause conditions or actions other than the granting of access to the originating remote computing device.

8. The system and method of claim 7 where said pre-existing instruction sets or rule sets, whether partially or fully configured, may include instructions or rules for modifying the data packets traversing said system.

\* \* \* \* \*